US012738508B2

(12) United States Patent
Yu et al.

(10) Patent No.: US 12,738,508 B2
(45) Date of Patent: Sep. 15, 2026

(54) HETEROELEMENT-DOPED HIGHLY GRAPHITIC POROUS CARBON BODY, A CATALYST INCLUDING THE SAME, AND A METHOD FOR PRODUCING THE SAME

(71) Applicant: DAEGU GYEONGBUK INSTITUTE OF SCIENCE AND TECHNOLOGY, Daegu (KR)

(72) Inventors: Jong Sung Yu, Seoul (KR); Ha Young Lee, Chungju-si (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 1060 days.

(21) Appl. No.: 17/801,491

(22) PCT Filed: Dec. 4, 2020

(86) PCT No.: PCT/KR2020/017638
§ 371 (c)(1),
(2) Date: Nov. 9, 2022

(87) PCT Pub. No.: WO2021/167212
PCT Pub. Date: Aug. 26, 2021

(65) Prior Publication Data

US 2023/0082237 A1 Mar. 16, 2023

(30) Foreign Application Priority Data

Feb. 21, 2020 (KR) ........................ 10-2020-0021427
Apr. 23, 2020 (KR) ........................ 10-2020-0049266

(51) Int. Cl.
*H01M 4/92* (2006.01)
*C01B 32/205* (2017.01)
(Continued)

(52) U.S. Cl.
CPC ........... *H01M 4/926* (2013.01); *C01B 32/205* (2017.08); *C25B 11/091* (2021.01);
(Continued)

(58) Field of Classification Search
CPC ... H01M 4/8803; H01M 4/926; C01B 32/205; C25B 11/091; C01P 2002/54; C01P 2002/74; C01P 2002/82; C01P 2006/12
See application file for complete search history.

(56) References Cited

U.S. PATENT DOCUMENTS 9,379,388 B2 * 6/2016 Calabrese Barton . H01M 4/881
2014/0255822 A1 * 9/2014 Asefa ...................... C01B 37/02 429/523

(Continued)

FOREIGN PATENT DOCUMENTS

CN 103172057 A 6/2013
CN 106744847 A 5/2017

(Continued)

OTHER PUBLICATIONS

Xing et al., "Nitrogen-Doped Nanoporous Graphenic Carbon: An Efficient Conducting Support for O2 Cathode," ChemNanoMat, May 20, 2016, vol. 2, pp. 692-697; Cited in NPL Nos. 1 and 2.*

(Continued)

*Primary Examiner* — Brittany L Raymond
(74) *Attorney, Agent, or Firm* — Hauptman Ham, LLP

(57) ABSTRACT

The present invention provides a method for producing a nitrogen-doped highly graphitic porous carbon body, and a nitrogen-doped highly graphitic porous carbon body produced according to the same. Also, the present invention provides a method for producing a sulfur and nitrogen double-doped highly graphitic porous carbon body, a sulfur and nitrogen double-doped highly graphitic porous carbon body produced according to the same, and an electrode
(Continued)

catalyst for a fuel cell and/or a water electrolysis reaction comprising the carbon body.

9 Claims, 16 Drawing Sheets

(51) Int. Cl.

*C25B 1/04* (2021.01)
*C25B 11/091* (2021.01)
*H01M 4/88* (2006.01)

(52) U.S. Cl.

CPC ....... *H01M 4/8803* (2013.01); *C01P 2002/54* (2013.01); *C01P 2002/72* (2013.01); *C01P 2002/74* (2013.01); *C01P 2002/82* (2013.01); *C01P 2002/85* (2013.01); *C01P 2002/88* (2013.01); *C01P 2004/03* (2013.01); *C01P 2004/04* (2013.01); *C01P 2006/12* (2013.01); *C01P 2006/40* (2013.01); *C25B 1/04* (2013.01)

(56) References Cited

U.S. PATENT DOCUMENTS

2018/0248175 A1* 8/2018 Ghezelbash .......... H01M 4/364
2019/0341626 A1* 11/2019 Kishimoto .............. H01M 4/96

FOREIGN PATENT DOCUMENTS

CN 106882783 * 10/2018
JP 2012-153555 A 8/2012
KR 10-2016-0105152 A 9/2016
KR 10-2016-0129938 A 11/2016
KR 10-1749486 B1 6/2017
KR 10-1969547 B1 4/2019

OTHER PUBLICATIONS

English translation of CN Publication 106882783, Oct. 2018.*

International Search Report mailed on Mar. 11, 2021, in connection with International Patent Application No. PCT/KR2020/017638, along with an English translation.

Written Opinion mailed on Mar. 11, 2021, in connection with International Patent Application No. PCT/KR2020/017638.

King et al., "Nitrogen-Doped Nanoporous Graphenic Carbon: An Efficient Conducting Support for O2 Cathode," ChemNanoMat, May 20, 2016, vol. 2, pp. 692-697; Cited in NPL Nos. 1 and 2.

Liu et al., "Graphene Supported Co—g—C3N4 as a Novel Metal-Macrocyclic Electrocatalyst for the Oxygen Reduction Reaction in Fuel Cells," Langmuir, Feb. 20, 2013, vol. 29, pp. 3821-3828; Cited in NPL Nos. 1 and 2.

Ma et al., "Novel synthesis of N-doped graphene as an efficient electrocatalyst towards oxygen reduction," Nano Research, 2016, vol. 9, pp. 808-819; Cited in NPL Nos. 1 and 2 and the Specification.

Li et al., "Facile synthesis of nitrogen and sulfur dual-doped graphitized carbon microspheres and their high performance in the oxygen reduction reaction," RSC Advances, Apr. 1, 2016, vol. 6, pp. 38880-38886; Cited in NPL Nos. 1 and 2.

Liang et al., "Sulfur and Nitrogen Dual-Doped Mesoporous Graphene Electrocatalyst for Oxygen Reduction with Synergistically Enhanced Performance," Angewandte Chemie International Edition, Oct. 10, 2012, vol. 51, pp. 11496-11500; Cited in the Specification.

* cited by examiner

HETEROELEMENT-DOPED HIGHLY GRAPHITIC POROUS CARBON BODY, A CATALYST INCLUDING THE SAME, AND A METHOD FOR PRODUCING THE SAME

CROSS-REFERENCE TO RELATED APPLICATION

The present application is a national stage filing under 35 U.S.C § 371 of PCT Application No. PCT/KR2020/017638 filed on Dec. 4, 2020, which is based on and claims priority to Korean Patent Application No. 10-2020-0021427 filed on Feb. 21, 2020, and Korean Patent Application No. 10-2020-0049266 filed on Apr. 23, 2020, in the Korean Intellectual Property Office, which are incorporated herein by reference in their entireties.

TECHNICAL FIELD

The present invention relates to a heteroelement-doped highly graphitic porous carbon body, a catalyst including the same, and a method for producing the same.

BACKGROUND ART

Though technology using various natural resources such as solar heat, wind power, and hydro energy as an energy source has been researched and developed, fuel cell technology is spotlighted as an alternative clean energy, due to its advantages such as not being thermodynamically limited (Carnot efficiency) by the way of direct power generation, having high power generation efficiency, having constant efficiency even in a wide load range, not releasing air pollutants such as nox ($No_x$), having extremely insignificant noise and vibration, allowing distributed electric power production, and allowing easy adjustment of power generation capacity.

A fuel cell is an energy conversion device which directly converts chemical energy possessed by fuel into electrical energy by an electrochemical reaction. A fuel cell system is formed around a stack in which fuel cell base unit cells of a fuel electrode/electrolyte/air electrode are connected in series and parallel, and a common fuel cell system is formed of a stack producing electricity, a fuel processing device which supplies fuel and oxygen to the stack, a conversion device which converts DC electric power produced in the stack into AC electric power, and a heat recovery device which recovers heat.

A fuel cell is classified into an alkaline fuel cell (AFC), a phosphoric acid fuel cell (PAFC), a polymer electrolyte membrane fuel cell (PEMFC), a molten carbonate fuel cell (MCFC), a solid oxide fuel cell (SOFC), and a direct methanol fuel cell (DMFC), and AFC, PEMFC, and DMFC have excellent starting performance with their operating temperature of 100° C. or lower which is much lower than that of other fuel cells, and are more preferred in terms of a clean energy source since they use various compounds such as methanol, ethanol, formaldehyde, and hydrogen as fuel. However, in spite of the advantages, a low-temperature fuel cell such as AFC, PEMFC, and DMFC uses platinum as an oxygen reduction reaction catalyst, and thus, for commercialization, a high cost problem due to an expensive catalyst should be solved, and furthermore, a catalyst based on platinum also has a problem of poor durability due to the factors such as migration, agglomeration, leaching, and growth of particles.

In order to solve the problems, two kinds of efforts are largely being made worldwide, such as the US, Japan, and Europe; one is decreasing a supported amount of platinum and effectively dispersing the platinum, and the other one is developing a non-platinum catalyst, but both cost reduction and performance improvement are not yet satisfied to the level of practical use.

Professor Dai's research team in the US developed an electrode having a longer life and 4 times better performance than a platinum (Pt) catalyst, by using vertically cultured carbon nanotubes doped with nitrogen as a metal-free oxygen reduction catalyst for a $H_2/O_2$ fuel cell (2009, Science). In addition, it was also reported that when the performance as a $H_2/O_2$ fuel cell catalyst was evaluated using nitrogen-doped graphene, catalytic activity similar to nitrogen-doped carbon nanotubes was shown (2010, ACS Nano). These methods may be very good research results to show that a nitrogen-doped carbon material may replace a platinum catalyst. However, even in the case of the nitrogen-doped graphene as such (nitrogen-doped carbon body), when it is actually used as a catalyst for a fuel cell, oxygen reduction activity is not yet sufficient and the crystallinity (graphite properties) of the carbon body is low, and thus, electrical conductivity and stability are not good. In addition, it is general that the platinum (Pt) catalyst is supported on a graphene (carbon body) support to form a catalyst, but in this case, the durability of the Pt/carbon body catalyst is not sufficiently secured.

Non-patent document 1 (Novel synthesis of N-doped graphene as an efficient electrocatalyst towards oxygen reduction, Nano Research, 2016, 9(3): 808-819) discloses that a polymer obtained by hydrothermally reacting pyrrole which is a precursor containing nitrogen at 200° C. is heat-treated at 600° C. for crystallinity improvement to synthesize nitrogen-containing graphene, but the technology shows low carbon crystallinity ($I_D/I_G$=1.17) in a Raman spectrum due to the heat treatment for carbonization at a relatively low temperature (600° C.), and thus, still has low crystallinity of a carbon body and has poor electrical conductivity and stability.

Patent Document 1 (Korean Patent Registration No. 10-1969547) is characterized in that a polymer resin solution including PVA, a nitrogen precursor (such as urea), silica nanoparticles, and the like is electrospun to produce nanofiber, which is heat-treated to produce carbon nanofiber, the silica nanoparticles are alkali leached to form two types of mesopores (diameters: 3 to 5 nm, 10 to 20 nm), thereby producing nitrogen-doped porous carbon nanotubes, and Pt/C is used as a catalyst for a fuel cell. Patent Document 1 has a problem in that since the nanofiber is carbonized by a heat treatment at a relatively high temperature of 900° C., doped nitrogen is decomposed into gaseous cyano-fragments ($C_xN_y$), $N_2$, $NH_3$, and the like. Thus, the content of doped nitrogen in the carbon body is lowered, and the crystallinity of the carbon body is easily deteriorated.

Patent Document 2 (Korean Patent Registration No. 10-1749486) uses a graphite oxide as a catalyst for a fuel cell, and a carbon body oxide has many defect sites such as oxygen so that the crystallinity of the carbon body is lowered and it is decomposed into Co, $CO_2$, and the like by oxidation during the operation of a fuel cell, resulting in deteriorated stability.

In Patent Document 3 (Chinese Patent Publication No. 106744847 A), a 2,5-benzimidazole nitrogen-containing precursor is mixed in a magnesium oxide (MgO) mold, heat-treated (crystallized) at 900° C., and a MgO mold is removed by acid leaching, thereby producing three-dimensional mesoporous nitrogen-doped graphene. However, Patent Document 3 has problems of low crystallinity of the produced graphene, a small amount of doped nitrogen, and poor stability of the catalyst, considering that the content of a nitrogen atom included in the nitrogen-containing precursor is very low, crystallinity is performed at a relatively high temperature of 900° C., and when the doped nitrogen is decomposed at a high temperature of 900° C., MgO is present as nanoparticles, and only contributes simply physical pore formation without preventing a doped nitrogen loss.

In Non-Patent Document 2 (Sulfur and Nitrogen Dual-Doped Mesoporous Graphene Electrocatalyst for Oxygen Reduction with Synergistically Enhanced Performance, Angewandte Chemie International Edition, 2012, 51, 11496-11500), melamine as a nitrogen precursor and benzyl disulfide (BDS) as a sulfur precursor are added to a mixture of a graphene oxide and silica ($SiO_2$), the mixture is heat-treated under the conditions of 900° C. and Ar and then acid-treated with hydrogen fluoride (HF) for removing silica, thereby synthesizing a nitrogen and sulfur-doped carbon body; however, in spite of the heat treatment for carbonization at a relatively high temperature (900° C.), low carbon crystallinity ($I_D/I_G$=~0.92) in a Raman spectrum is shown, and since silica is added for mesopore formation, a process of two steps is needed in addition to the carbonization process, and thus, the process is somewhat complicated and difficult to be applied.

In Patent Document 4 (KR 10-2016-0105152A), a S or N-containing precursor and an alkali metal source are mixed to produce a mixed solution, which is acid-treated (hydrochloric acid) after carbonization to synthesize a S or N-doped carbon body; however, the used alkali metal is a Group 1 metal such as lithium, sodium, and potassium, has strong reducing power so that it explosively reacts to air in the atmosphere and water, and thus, it is very dangerous to actually apply the inventions, and practical application is difficult in that attention should be paid to sealing of a container and deoxidation and dehydration of a used reaction solution for the reaction. In addition, NaOH used in the specific example is not preferred in that the micropores of a carbon body produced by a reaction in a liquid phase are developed to lower crystallinity and a functional group containing oxygen is included to require an additional heat treatment, in a process often used as a method of activating a carbon body (increasing a specific surface area by development of micropores, through layer separation by intercalation of metal) in the process of carbonization.

In Patent Document 5 (JP 2012-153555A), a precursor compound having any one or more heteroatoms such as nitrogen and sulfur, and an alkali metal are mixed, and the mixture is heat-treated at 100 to 400° C. and then is thermally decomposed at 250 to 1,500° C. to synthesize heteroatom-containing graphene, but it is difficult to apply the technology for the same reason as Patent Document 1 described above.

In Patent Document 6 (KR 10-2016-0129938A), a precursor containing sulfur, a silica template, and the like are mixed to form a composition in a powder form, which is heated at 800 to 900° C. using the silica template to form crystalline carbon, which is pickled to remove the used silica template, thereby producing a carbon catalyst having a porous structure, and the document discloses thiourea and thioacetamide as a precursor containing sulfur as a specific example; however, the silica template added for forming mesopores does not contribute to increasing the crystallinity of the carbon body in carbonization, should be treated in a strong acid or strong base condition for removal by dissolution, and thus, is not good in terms of process efficiency.

DISCLOSURE

Technical Problem

An object of the present invention is to provide a method for producing a highly graphitic porous carbon body doped with a heteroelement such as nitrogen which has high graphitic properties to have improved electrical conductivity and stability, has an increased doping amount of a heteroelement such as nitrogen, has improved oxidation reduction performance, and also secures the specific surface area of the carbon body to a constant level to increase the commerciality as a carbon body support in supporting Pt, a highly graphitic porous carbon body doped with a heteroelement such as nitrogen, and an electrode catalyst for a fuel cell and/or a water electrolysis reaction including the same.

Another object of the present invention is to provide a technology which significantly increases the crystallinity of carbon, which is doped with a heteroelement as a defect, and also, possesses mesopores in a low-temperature reaction (1,000° C. or lower).

Technical Solution

In one general aspect, a method for producing a nitrogen-doped highly graphitic porous carbon body includes: (a) polymerizing a nitrogen element-containing precursor to produce a polymer; (b) mixing the polymer and metal powder in an inert atmosphere, and then heat-treating the mixture at a temperature equivalent to or higher than a melting point of the metal; and (c) adding a product from the heat treatment to an acid solution and performing stirring.

The nitrogen element-containing precursor may be urea, dicyandiamide, melamine, aniline, ethylenediamine, ethylene diamine tetraacetic acid (EDTA), or a combination thereof.

The polymer may contain 40 to 80 atom % of N as a heteroelement.

A melting point of the metal may be 1,000° C. or lower.

The metal powder may be magnesium (Mg), calcium (Ca), aluminum (Al), lithium (Li), sodium (Na), potassium (K), or mixed powder thereof.

In step (b), the polymer and the metal powder may be mixed at a weight ratio of 1:0.5 to 1:3.

In step (b), the polymer and the metal powder may be mixed at an atomic molar ratio of N:M of 1:0.3 to 1:7.5 (N is nitrogen contained in the polymer as a heteroelement, and M is a metal element of metal powder).

The heat treatment in step (b) may be performed at a temperature of lower than 2,000° C., and most preferably lower than 1,000° C.

In another general aspect, a nitrogen-doped highly graphitic porous carbon body includes 0.5 to 6 atom % of N as a heteroelement and has a peak intensity ratio $I_D/I_G$ of less than 1.0 as measured with a Raman spectrum ($I_D$ is a peak intensity of a D band (at around 1,350 $cm^{-1}$) in the Raman spectrum, and $I_G$ is a peak intensity of a G band (at around 1,580 $cm^{-1}$) in the Raman spectrum).

The peak intensity ratio $I_{2D}/I_G$ of the nitrogen-doped highly graphitic porous carbon body may be 0.5 or more as measured with the Raman spectrum ($I_{2D}$ is a peak intensity of a 2D band (at around 2, 700 $cm^{-1}$) in the Raman spectrum, and $I_G$ is a peak intensity of a G band (at around 1,580 $cm^{-1}$) in the Raman spectrum).

The nitrogen-doped highly graphitic porous carbon body may have a BET specific surface area of 200 $m^2/g$ or more.

The BET specific surface area of the nitrogen-doped highly graphitic porous carbon body may be 200 to 1,000 $m^2/g$.

The nitrogen-doped highly graphitic porous carbon body may include a binding state of pyrrolic N, graphitic N, pyridinic N, or a combination thereof.

The nitrogen-doped highly graphitic porous carbon body may have a binding state of pyrrolic N of 30% or more, with respect to 100 atom % of heteroelemental nitrogen (N).

In another general aspect, an electrode catalyst for a fuel cell includes: the nitrogen-doped highly graphitic porous carbon body.

The nitrogen-doped highly graphitic porous carbon body may have platinum (Pt) supported on the surface and the inside.

In another general aspect, a method for producing a sulfur and nitrogen double-doped highly graphitic porous carbon body includes: polymerizing a sulfur and nitrogen element-containing precursor to produce a polymer; mixing the polymer and metal powder in an inert gas atmosphere, and then heat-treating the mixture at a temperature equivalent to or higher than a melting point of the metal; and pickling a product from the heat treatment.

The sulfur and nitrogen element-containing precursor may be at least one selected from the group consisting of thiourea, ammonium thiocyanate, and thioacetamide.

The sulfur and nitrogen element-containing precursor includes a sulfur-containing precursor and a nitrogen-containing precursor, and the sulfur-containing precursor may be an organic molecular precursor or a polymer precursor including at least one selected from the group consisting of benzyl disulfide (BDS), thiophene, 2,2'-dithiophene, p-toluenesulfonic acid, and 2-thiophenemethanol, and the nitrogen-containing precursor may be an organic molecule or a polymer precursor including at least one selected from the group consisting of amino acids such as guanine, adenine, and purine, melamine, urea, pyridine, aniline, dicyandiamide, ethylenediamine, benzimidazole, and ethylene diamine tetraacetic acid (EDTA).

The metal powder may be alkaline earth metal powder.

The polymer and the metal powder may be mixed at an atomic molar ratio of N+S:M of 1:0.3 to 1:7.5. Here, N and S are nitrogen and sulfur contained in the polymer as a heteroelement, respectively, M is a metal element of the metal powder, and N+S is a total of nitrogen and sulfur elements.

In another general aspect, a sulfur and nitrogen double doped highly graphitic porous carbon body having a peak intensity ratio measured with a Raman Spectrum satisfying the following Relations 1 and 2 is provided:

$$0 \le I_D/I_G \le 0.95 \quad \text{[Relation 1]}$$

$$0.3 \le I_{2D}/I_G \le 3.0 \quad \text{[Relation 2]}$$

wherein $I_D$ is a peak intensity of a D band (at around 1,350 $cm^{-1}$) in a Raman spectrum, $I_G$ is a peak intensity of a G band (at around 1,580 $cm^{-1}$) in the Raman spectrum, and $I_{2D}$ is a peak intensity of a 2D band (at around 2, 700 $cm^{-1}$) in the Raman spectrum.

The carbon body may satisfy the following Relation 3:

$$V_1/V_2 \le 1.0 \quad \text{[Relation 3]}$$

wherein $V_1$ is a volume ($cm^3/g$) of micropores of the carbon body, and $V_2$ is a volume ($cm^3/g$) of mesopores of the carbon body.

The carbon body may include mesopores at a volume of 0.3 to 1.8 $cm^3/g$.

The carbon body may include 0.3 to 6.0 atom % of N and 0.1 to 3.0 atom % of S as heteroelements.

The carbon body may have a BET specific surface area of 80 to 1,000 $m^2/g$.

Still another general aspect, an electrode catalyst for a fuel cell and/or a water electrolysis reaction includes the sulfur and nitrogen double doped highly graphitic porous carbon body.

The electrode catalyst for a fuel cell and/or a water electrolysis may have platinum (Pt), rhodium (Rh), ruthenium (Ru), nickel (Ni), cobalt (Co), iron (Fe), palladium (Pd), copper (Cu), iridium (Ir), osmium (Os), molybdenum (Mo), vanadium (V), or a combination thereof supported on the surface and the inside of the sulfur and nitrogen double-doped highly graphitic porous carbon body.

Advantageous Effects

In the present invention, metal powder having high reducing power is introduced to a carbonization process and is bonded to nitrogen in a precursor with strong reducing power to separate $sp^2$ carbon of the precursor from nitrogen, thereby allowing easier carbon-to-carbon bonding to promote a graphitization process, and though it is a sample treated at a relatively low temperature, it shows high carbon crystallinity in a Raman spectrum. In the present invention, high graphitizing properties of a carbon body are secured even with manufacture at a relatively low temperature, thereby effectively preventing a loss of a doping amount of nitrogen and other heteroelements produced in a high-temperature heat treatment. In addition, in spite of the manufacture of a high graphitic carbon body, porosity is secured by an acid treatment, thereby securing a specific surface area equivalent to or higher than the conventional technology.

In addition, in the present invention, an alkaline earth metal is introduced to a carbonization process and is bonded to nitrogen in a precursor with strong reducing power to separate $sp^2$ carbon of the precursor from nitrogen, thereby allowing easier carbon-to-carbon bonding to promote a graphitization process, and it may be confirmed that though it is a sample treated at a low temperature of 650 to 1000° C. low temperature, it has high carbon crystallinity in a Raman spectrum.

That is, the present invention may provide a method for producing a porous carbon body in which high crystallinity at a low temperature is secured to prevent a loss of a doping amount of heteroelements (sulfur and nitrogen) at a high temperature, high crystallinity of a carbon body is secured, and an alkaline earth metal used through an acid treatment is removed to secure porosity including mesopores in the removed site, so that the porous carbon body has a specific surface area of 80 to 1000 $m^2/g$, and a carbon body.

DESCRIPTION OF DRAWINGS

FIG. 11 is (a) a graph showing the results of X-ray diffraction (XRD) spectroscopy analysis for SCNMg-X (950, 850, and 750° C.), SCN (sulfur-supported nitride carbide), and graphite, (b) a graph showing Raman spectrum analysis, (c) a graph showing nitrogen adsorption and desorption isotherms, and (d) a graph showing electrical conductivity depending on relative pressure change.

In FIG. 15, (a) to (c) show XPS spectra for SCNMg-850 and SCN in which (a) is a C 1s spectrum, (b) is a N 1s spectrum, and (c) is S 2p spectrum, and (d) and (e) are schematic diagrams of SCN and SCNMg-X, respectively.

BEST MODE

Figure 1:
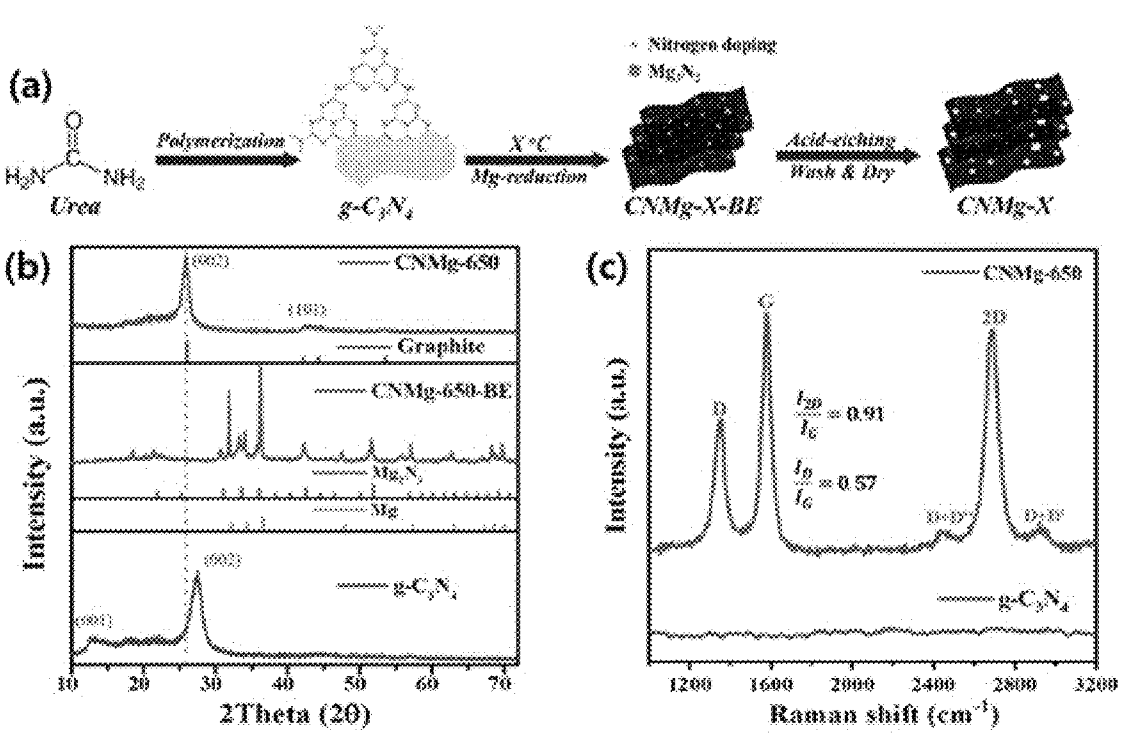
In FIG. 1, (a) is a schematic diagram showing a synthesis process of a nitrogen-doped highly graphitic porous carbon body (CNMg) according to an exemplary embodiment of the present invention, (b) is a graph showing the results of X-ray diffraction (XRD) spectroscopy analysis for the products of each step (corresponding in order from bottom to top of the graph), in the production of a nitrogen-doped highly graphitic carbon body synthesized at 650° C. according to Example 1-1, and (c) is a graph showing a Raman spectrum analysis of a nitrogen-doped highly graphitic porous carbon body (CNMg-650) as the final product.

Advantages and features of the present invention and methods to achieve them will be elucidated from exemplary embodiments described below in detail with reference to the accompanying drawings. However, the present invention is not limited to exemplary embodiments disclosed below, but will be implemented in various forms. The exemplary embodiments of the present invention make disclosure of the present invention thorough and are provided so that those skilled in the art can easily understand the scope of the present invention. Therefore, the present invention will be defined by the scope of the appended claims. Detailed description for carrying out the present invention will be provided with reference to the accompanying drawings below. Regardless of the drawings, the same reference number indicates the same constitutional element, and "and/or" includes each of and all combinations of one or more of mentioned items.

Unless otherwise defined herein, all terms used in the specification (including technical and scientific terms) may have the meaning that is commonly understood by those skilled in the art. Throughout the present specification, unless explicitly described to the contrary, "comprising" any elements will be understood to imply further inclusion of other elements rather than the exclusion of any other elements. In addition, unless explicitly described to the contrary, a singular form includes a plural form herein.

In the present specification, it will be understood that when an element such as a layer, film, region, or substrate is referred to as being on or above another element, it can be directly on the other element or intervening elements may also be present.

An exemplary embodiment of the present invention provides a method for producing a nitrogen-doped highly graphitic porous carbon body. The method is characterized by including: (a) polymerizing a nitrogen element-containing precursor to produce a polymer; (b) mixing the polymer and metal powder in an inert atmosphere, and then heat-treating the mixture at a temperature equivalent to or higher than a melting point of the metal; and (c) adding a product from the heat treatment to an acid solution and performing stirring.

In step (a), the polymerizing of a nitrogen element-containing precursor to produce a polymer may be, as a non-limiting example, producing a graphitic-$C_3N_4$ (g-$C_3N_4$) polymer, and a commonly known method of producing a graphitic-$C_3N_4$ (g-$C_3N_4$) may be applied. As a non-limiting example, the nitrogen element-containing precursor is added to an airtight container, and a reaction may be performed at a heating rate of 1 to 5° C./min, at a reaction temperature of 300 to 1,000° C. for 1 to 6 hours, and preferably at a heating rate of 2 to 4.5° C./min at a reaction temperature of 300 to 1000° C. for 3 to 6 hours to produce a polymer.

The nitrogen element-containing precursor may be urea, dicyandiamide, melamine, or a combination thereof. Since the nitrogen element-containing precursor described above is an organic compound which has a higher content of nitrogen than carbon, and may be easily decomposed at a reaction temperature (300 to 1,000° C.) in step (a) and polymerized, a polymer having a high nitrogen doping content may be produced, which is preferred.

The polymer produced is a heteroelement and may content 40 to 80 atom % of N, and specifically, may contain 40 to 60 atom % of N as a heteroelement. The polymer may be, as an example, graphitic-$C_3N_4$ (g-$C_3N_4$), but the present invention is not limited thereto. Since nitrogen contained in a carbon structure has a higher electron affinity than carbon and has an unshared electron pair, it easily forms an electronic structure, and thus, it is easy to provide a site appropriate for an oxygen reduction reaction. However, when the content of N is more than 80 atom %, a carbon body is, if produced, easily decomposed so that it is difficult to form a carbon-to-carbon bond and the crystallinity is poor, and when the content of N is less than 40 atom %, the content of nitrogen is insufficient in the production of the carbon body, so that the activity of the oxygen reduction reaction is not sufficiently secured, which is thus disadvantageous.

In step (b), the polymer and the metal powder are mixed in an inert atmosphere, and then a heat treatment is performed at a temperature equivalent to or higher than the melting point of the metal.

Since the metal powder melted by the heat treatment is applied all over the surface of the polymer, a metal-nitride may be formed well by the high reducibility of the metal. In the conventional technology, when there is no formation of metal-nitride, the heat treatment may be performed at lower than 2,000° C. or lower than 1,000° C., preferably 600 to 950° C., more preferably 600 to 900° C., or 600 to 850° C., and most preferably 600° C. or higher and lower than 850° C. for increasing the crystallinity of the carbon body. Since nitrogen doped into the polymer is decomposed into gaseous cyano-fragments ($C_xN_y$), $N_2$, $NH_3$, and the like at a temperature of about 600° C. or higher, as the heat treatment temperature is higher, it is unfavorable in terms of a doped nitrogen loss, and in contrast, as the heat treatment temperature is lowered, the crystallinity (graphiticity) of the synthesized carbon body is lowered. In the present invention, since the polymer and the metal powder are mixed and heat-treated, the above problems may be prevented.

When the metal of the metal powder has a melting point of 1,000° C. or lower, a doping nitrogen loss may be effectively suppressed. Specifically, when the melting point of the metal is lower than 1,000° C., 950° C. or lower, 900° C. or lower, 800° C. or lower, or 750° C. or lower, a problem that the metal powder is only partly melted at a temperature at which a doped nitrogen loss occurs (600° C.) so that the entire surface of the polymer is not covered is prevented, thereby suppressing the doping nitrogen loss in the heat treatment may be suppressed. In addition, when the preferred lower limit of the melting point of the metal is higher than 50° C., 100° C. or higher, 150° C. or higher, 550° C. or higher, or 600° C. or higher, problems that the metal powder is all melted at too low temperature to lower the crystallinity of carbon in the production of the carbon body and handling is difficult may be prevented.

The metal powder may be magnesium (Mg), calcium (Ca), aluminum (Al), lithium (Li), sodium (Na), potassium (K), or mixed powder thereof, and preferably magnesium. As an example, magnesium melted and applied on the surface of the polymer reacts with a part of doped nitrogen (N) to form $Mg_3N_2$. Thus, a carbon atom remaining in the carbon body is a $sp^2$ hybridized carbon, and rapidly forms a carbon-carbon bond in spite of a relatively low heat treatment temperature (lower than 1,000° C.) to contribute conversion of the polymer into graphene having high crystallinity. In the crystallization process of the carbon body, a part of nitrogen is not decomposed to gaseous cyano-fragments ($C_xN_y$) and remains in a doped state in the highly crystalline carbon body.

Meanwhile, a representative reducing agent metal applied to a reduction process of a metal and the like is calcium, aluminum, magnesium, and the like in order of reducing power; however calcium is somewhat unfavorable in that it has a high melting point of 850° C. or higher so that it is inevitably operated at a high temperature, has a risk of explosion, and is expensive, and aluminum has excellent stability, is easy to handle, and has good reducing power, but has a disadvantage in that it is difficult to remove AlN, $Al_2O_3$, and the like which are mixed after the reduction process. However, since magnesium has a relatively low melting point of 650° C., is easy to handle, and has excellent reducing power, it is the most preferred to be applied to the present invention.

In step (b), the polymer and the metal powder may be mixed at a weight ratio of 1:0.5 to 1:3, preferably 1:0.7 to 1:2, or 1:0.7 to 1:1.5, more preferably 1:0.9 to 1:1.1, and most preferably about 1:1. In addition, the polymer and the metal powder may be mixed at an atomic molar ratio of N:M of 1:0.3 to 1:7.5, preferably 1:0.3 to 1:5 or 1:0.5 to 1:3, more preferably 1:0.7 to 1:2, more preferably 1:0.9 to 1:1.2, and most preferably about 1:1 (N refers to nitrogen contained in the polymer as a heteroelement, M refers to a metal element of the metal powder). When the polymer and the metal powder are included at the above contents, formation of metal-nitride may be optimized as described later.

The heat treatment in step (b) may be performed at a temperature of 550° C. or higher and lower than 1,000° C., 550 to 950° C., preferably 550 to 900° C., 600 to 850° C., 600 to 800° C., 600 to 750° C., and more preferably 600 to 700° C. Carbonization is performed at a relatively low temperature, and it is analyzed that as the temperature is lower in the heat treatment temperature range, the content of doped nitrogen is increased, and the ratio of pyrrolic-N in the doped nitrogen may be increased. Meanwhile, the nitrogen-doped highly graphitic porous carbon body representatively includes binding states of pyrrolic N, graphitic N, pyridinic N, and pyridinic N-oxide, and since the electron pairs of the pyrrolic N is involved in aromatic stabilization, the pyrrolic N has higher binding energy than graphitic N, pyridinic N, and the like, and thus, may improve the crystallinity of the nitrogen-doped carbon body and increase oxygen reduction activity.

Meanwhile, the heat treatment may be performed in an inert gas flow atmosphere, for example, a nitrogen flow atmosphere, or an argon, or $Ar/H_2$ flow atmosphere, but is not limited thereto.

In step (c), the heat-treated product in step (b) is added to an acid solution and stirring is performed.

The acid solution may be removed by etching residual metal powder remaining in the heat-treated product and a metal-nitride as a by-product by an acid. In the site of the carbon body from which the residual metal powder and the metal-nitride have been removed by the acid etching, a pore structure including mesopores may be formed. In particular, since the pore structure is formed by the acid etching after the heat treatment is performed at a relatively low temperature, the pore structure which is uniformly formed on the inside or the surface of the nitrogen-doped highly graphitic porous carbon body may contribute to BET specific surface area improvement. However, when the crystallinity of the carbon body is increased by a simple high-temperature heat treatment as a conventional technology, a decomposition problem arises due to small fragments such as $N_2$, $NH_3$, $CH_x$, and gaseous $C_xN_y$, and simultaneously, since the pores formed at this time is formed mainly on an edge surface, the BET specific surface area is decreased.

In step (c), the heat-treated product of step (b) may be added to a 0.5-3.5 M acid solution, for example, a 1-3 M hydrochloric acid solution, stirring may be performed for 1-10 hours, preferably 2-8 hours to perform acid leaching, and then the recovered product may be filtered by deionized water or the like and dried, thereby obtaining the nitrogen-doped highly graphitic porous carbon body according to an exemplary embodiment, but the present invention is not limited thereto.

Another exemplary embodiment of the present invention provides a nitrogen-doped highly graphitic porous carbon body. The nitrogen-doped highly graphitic porous carbon body is characterized by containing 0.5 to 6 atom % of N as a heteroelement, and having a peak intensity ratio $I_D/I_G$ of less than 1.0 as measured with a Raman spectrum.

Specifically, it is preferred that the nitrogen-doped highly graphitic porous carbon body may contain 0.6 to 6 atom %, preferably 0.6 to 4 atom % of N as a heteroelement, and have a peak intensity ratio $I_D/I_G$ of 0.1 to 0.95, preferably 0.1 to 0.8, more preferably 0.1 to 0.7, or 0.2 to 0.6, as measured with the Raman spectrum. $I_D$ is a peak intensity of a D band (at around 1,350 $cm^{-1}$) in the Raman spectrum, and is a peak due to a defect in a crystal and known to be observed near the edge of a sample or when there are many defects in the sample in the case of graphene. $I_G$ is a peak intensity of a G band (at around 1,580 $cm^{-1}$) in the Raman spectrum, and is a peak commonly found in graphite-based materials. That is, the present invention corresponds to the content of the doped nitrogen and the $I_D/I_G$ range, and since the high crystallinity of the carbon body is secured even at a low temperature, the loss of the nitrogen doping amount occurring at a high temperature may be suppressed.

In addition, the nitrogen-doped highly graphitic porous carbon body has a peak intensity ratio $I_{2D}/I_G$ of 0.8 to 1.7, preferably 0.9 to 1.6, as measured with the Raman spectrum. $I_{2D}$ is a peak intensity of a 2D band (at around 2,700 $cm^{-1}$) in the Raman spectrum, and shows a tendency to be inversely proportional to the number of graphene layers. Since the carbon body of the present invention corresponds to the range of $I_{2D}/I_G$, it may be graphene formed of 1 to 3 layers, preferably 1 or 2 layers.

The nitrogen-doped highly graphitic porous carbon body may have a BET specific surface area of 100 $m^2/g$ or more, preferably 200 to 500 $m^2/g$, and more preferably 300 to 450 $m^2/g$, a total pore volume of 0.3 $cm^3/g$ or more, preferably 0.4 to 2.0 $cm^3/g$, and more preferably 0.4 to 1.5 $cm^3/g$, a mesopore volume of 0.5 $cm^3/g$ or more, 0.6 $cm^3/g$ or more, 0.7 $cm^3/g$ or more, or 0.8 $cm^3/g$ or more and 2 $cm^3/g$ or less or 1.5 $cm^3/g$ or less, and an average pore size of 1 to 30 nm, preferably 3 to 20 nm, and more preferably 6 to 15 nm.

Meanwhile, the BET specific surface area is calculated using a Brunauer-Emmett-Teller method based on the results of nitrogen adsorption at a relative pressure in a range of 0.05 to 0.2, and the total pore volume is calculated from a gas adsorption amount at a relative pressure of 0.99. In addition, the mesopore size is measured by a Barrett-Joyner-Halenda method based on a Kelvin equation, and the mesopore volume is analyzed using the amount of adsorbed nitrogen at a relative pressure of 0.95 or less.

The nitrogen-doped highly graphitic porous carbon body may include binding states of pyrrolic N, graphitic N, pyridinic N, or a combination thereof; 20% or more, preferably 50% or more with respect to 100 atom % of the nitrogen (N) as a heteroelement is present as a binding state of pyrrolic N, as a non-limiting example, the upper limit may be 75% or less or 70% or less, and graphitic N may be 10% or less, pyridinic N may be 15% or more, preferably 20% or more, and more preferably 25% or more. In particular, it is known that since the electron pair of the pyrrolic N is involved in aromatic stabilization, it has higher binding energy than graphitic N, pyridinic N, and the like. Since the present invention has a higher ratio of pyrrolic N in the doped N, the crystallinity of the nitrogen doped carbon body may be improved and the activity of the oxygen reduction reaction may be improved.

Another exemplary embodiment provides an electrode catalyst for a fuel cell and/or a water electrolysis reaction including a highly graphitic porous carbon body doped with a heteroelement such as nitrogen. The nitrogen-doped highly graphitic porous carbon body may have platinum (Pt) supported on the surface and the inside.

Meanwhile, a water electrolysis reaction is a technology producing hydrogen and oxygen from pure water using electric energy, is largely classified into alkaline water electrolysis, solid polymer electrolyte membrane (PEM) water electrolysis, and high-temperature water vapor electrolysis using a solid oxide, and the nitrogen and heteroelement-doped highly graphitic porous carbon body of the present invention may be used as an electrode catalyst for a water electrolysis reaction as well as an electrode catalyst for a fuel cell.

Another exemplary embodiment of the present invention provides a method for producing a sulfur and nitrogen double doped highly graphitic porous carbon body. The method is characterized by including: polymerizing a sulfur and nitrogen element-containing precursor to produce a polymer; mixing the polymer and metal powder in an inert gas atmosphere, and then heat-treating the mixture at a temperature equivalent to or higher than a melting point of the metal; and pickling a product from the heat treatment.

In the polymerizing step, the hybrid orbital of carbon changes from $sp^3$ to $sp^2$, and thus, crystal structure arrangement in which it changes to crystalline carbon ($sp^2$) later in the heat treatment step (carbonization step) is easy. However, when the carbonization is performed using a monomolecular precursor without the polymerizing step, the hybridization and the crystal structure arrangement of carbon should be performed at the same time in the carbonization process, and thus, a heteroelement content is greatly decreased and process efficiency is not good.

The step of polymerizing of a precursor may include adding the sulfur and nitrogen element-containing precursor to an airtight container and reacting at a heating rate of 1.0 to 5.0° C./min at a reaction temperature of 300 to 1,500° C. for 1 to 6 hours, and preferably at a heating rate of 2.0 to 4.5° C./min at a reaction temperature of 300 to 1,000° C. for 3 to 6 hours.

The sulfur and nitrogen element-containing precursor may be at least one selected from the group consisting of thiourea, ammonium thiocyanate, and thioacetamide. The precursor has a higher content of nitrogen than carbon and is easily decomposed at a low temperature, and thus, is an organic compound which is difficult to polymerize. Meanwhile, an oxygen element which may be contained in the carbon body produced as a heteroelement corresponds to a defect, and decreases the crystallinity of the carbon body and needs an additional heat treatment to remove it, and thus, is not preferred.

Meanwhile, in addition to the precursor containing both sulfur and nitrogen elements described above, a precursor in which a sulfur-containing precursor and a nitrogen-containing precursor are mixed may be individually used. The sulfur-containing precursor may be an organic molecular precursor or a polymer precursor including at least one selected from the group consisting of benzyl disulfide (BDS), thiophene, 2,2'-dithiophene, p-toluenesulfonic acid, and 2-thiophenemethanol, and the nitrogen-containing precursor may be an organic molecule or a polymer precursor including at least one selected from the group consisting of amino acids such as guanine, adenine, and purine, melamine, urea, pyridine, aniline, dicyandiamide, ethylenediamine, benzimidazole, and ethylene diamine tetraacetic acid (EDTA).

As a non-limiting example, a precursor in which the sulfur-containing precursor and the nitrogen-containing precursor are mixed at a weight ratio of 5:5 to 1:9 may be used, and specifically, a precursor mixed at a weight ratio of 5:5 to 4:6, 3:7 to 2:8, or 1.5:8.5 to 1:9 may be used. Otherwise, a precursor which is mixed so that a ratio between the number of moles of S element in the sulfur-containing precursor and the number of moles of N element in the nitrogen-containing precursor is 1:1 to 1:2.5 may be used, and specifically, a precursor which is mixed so that the ratio is 1:1 to 1:1.2, 1:1.5 to 1:1.7, or 1:2 to 1:2.5 may be used. In this case, in the carbonization process, it is favorable that the nitrogen and sulfur doping amounts are individually precisely adjusted considering a loss degree of each doping element.

The polymer may include sulfur-doped graphitic $C_3N_4$ at 30 to 90 wt %, preferably 50 to 70 wt %, with respect to the total weight. It is very favorable for forming a carbon hexagonal structure in the carbonization step and may increase the crystallinity of the carbon body, in that its atomic arrangement and hybrid orbital are similar to those of the graphene structure.

In addition, the polymer produced may contain 40 to 80 atom % or 40 to 60 atom % of N and 0.01 to 10 atom % or 0.01 to 5 atom % of S as a heteroelement. Sulfur and nitrogen doping may improve adsorption of a reaction chemical species in a hydrogen generation reaction using the carbon body. Specifically, since nitrogen and sulfur contained in a carbon structure have a higher electron affinity than carbon and have an unshared electron pair, they easily form an electronic structure favorable to the reaction, and thus, it is easy to provide a site appropriate for hydrogen generation reaction/oxygen reduction reaction. However, when the N content is more than 80 atom % or the S content is more than 10 atom %, the carbon body is easily decomposed during its production so that it is difficult to form a carbon-to-carbon bond, and its crystallinity is poor, and when the N content is less than 40 atom % and the S content is less than 0.01 atom %, the activity of hydrogen generation reaction/oxygen reduction reaction is insufficient, which is thus unfavorable.

Subsequently, the polymer produced above and the metal powder are mixed in an inert atmosphere, and then a heat treatment is performed at a temperature equivalent to or higher than the melting point of the metal.

In the heat treatment step (carbonization step), since molten metal powder is applied all over the surface of the polymer, metal-nitride or metal-sulfide may be formed well by the high reducibility of the metal. When there is no formation of metal-nitride or metal sulfide, doped nitrogen and sulfur are decomposed in the heat treatment at 600° C. or higher, and thus, when the heat treatment temperature is higher, it is unfavorable in terms of doped nitrogen and sulfur loss, and in contrast, when the heat treatment temperature is lower, the crystallinity (graphiticity) of the synthesized carbon body is lowered, but the problem may be prevented in the present invention.

The heat treatment temperature may be 1,500° C. or lower, preferably 650 to 1,000° C., more preferably 650 to 950° C., and most preferably 700 to 900° C. In addition, when the metal of the metal powder has a melting point of 1,000° C. or lower, a doping nitrogen and sulfur loss may be effectively suppressed. Specifically, when the melting point of the metal is lower than 1,000° C., 950° C. or lower, 900° C. or lower, 800° C. or lower, or 750° C. or lower, a problem that the metal powder is only partly melted at a temperature at which a doped nitrogen or sulfur loss occurs (600° C.) so that the entire surface of the polymer is not covered may be prevented. In addition, when the preferred lower limit of the melting point of the metal is higher than 50° C., 100° C. or higher, 150° C. or higher, 550° C. or higher, or 600° C. or higher, problems that the metal powder is all melted at too low temperature to lower the crystallinity in the production of the carbon body and handling is difficult may be prevented.

The metal powder may be alkaline earth metal powder, and for example, may be magnesium (Mg) or calcium (Ca), preferably magnesium. A representative reducing agent metal applied to a reduction process of a metal and the like is calcium, aluminum, magnesium, and the like in order of reducing power; however calcium is somewhat unfavorable in that it has a high melting point of 850° C. or higher so that it is inevitably operated at a high temperature, has a risk of explosion, and is expensive, and aluminum has excellent stability, is easy to handle, and has good reducing power, but has a disadvantage in that it is difficult to remove AlN, $Al_2O_3$, and the like which are mixed after the reduction process. However, since magnesium has a relatively low melting point of 650° C., is easy to handle, and has excellent reducing power, it is the most preferred to be applied to the present invention. In addition, the metal powder may have a metal particle diameter of 70 to 100 μm or 40 to 70 μm. When the particle diameter is more than 100 μm, uniform mixing with the polymer is difficult, and it is unfavorable for uniform mesopore formation. When the metal particle diameter is less than 40 μm, it reacts with oxygen or water in the air so that it is difficult to maintain a metallic surface, which is unfavorable in terms of reactivity and reducing power.

Meanwhile, the particle diameter of the metal particles may refer to D50, and D50 refers to a diameter of a particle with a cumulative volume of 50% when cumulated from the smallest particle in measurement of a particle size distribution by a laser scattering method. Here, for D50, the particle size distribution may be measured by collecting a sample for a metal particle material according to the standard of KS A ISO 13320-1, using Mastersizer 3000 from Malvern. Specifically, a volume density may be measured after particles are dispersed in ethanol as a solvent, using an ultrasonic disperser, if necessary, but the present invention is not limited thereto.

In the heat treatment step, the polymer and the metal powder may be mixed at a weight ratio of 1:0.5 to 1:3, preferably 1:0.7 to 1:1.5, more preferably 1:0.9 to 1:1.1, and most preferably about 1:1. In addition, the bulk graphite type polymer and the metal powder may be mixed at an atomic molar ratio of N+S:M of 1:0.3 to 1:7.5, preferably 1:0.5 to 1:4, more preferably 1:0.7 to 1:2.0, more preferably 1:0.9 to 1:1.3, and most preferably about 1:1. When the polymer and the metal powder are included at the above content, formation of metal-nitride and metal-sulfide may be optimized, as described later, which is thus preferred. Meanwhile, N and S are nitrogen and sulfur contained in the polymer as a heteroelement, respectively, M is a metal element of the metal powder, and N+S is a total of nitrogen and sulfur elements.

The heat treatment may be performed in an inert gas flow atmosphere, for example, a nitrogen flow atmosphere, or an argon, hydrogen/argon mixed flow atmosphere, but is not limited thereto.

Subsequently, by pickling the heat-treated product, residual metal powder, and metal-nitride and metal-sulfide as a by-product may be removed by etching. As the etching effect, a mesopore structure (formation of mesopores having a size of 2 to 50 nm) may be formed in the site of the carbon body from which residual metal powder, metal-nitride, and metal-sulfide are removed. The residual metal powder, the metal nitride, and metal sulfide may be, for example, residual magnesium powder (Mg), magnesium nitride ($Mg_2N_3$), and magnesium sulfide (MgS) having a uniform size of 20 to 50 nm, and by removal by the pickling, a carbon body having mesopores formed may be produced. In particular, since the mesopore structure has a tendency of having a larger pore structure with a higher carbonization heat treatment temperature, a low-temperature carbonization process is essentially required. In addition, it is analyzed that magnesium nitride has a greater effect on mesopore formation than residual magnesium, and this may be possible by using magnesium at tens of μm particle size level (70 to 100 μm or 40 to 70 μm) to form magnesium nitride which is distributed in a liquid phase in the reaction to have a uniform size (20 to 50 nm).

In particular, since the mesopore structure is formed by the acid etching after the heat treatment is performed at a relatively low temperature, the pore structure which is uniformly formed inside or on the surface of the carbon body may contribute to specific surface area improvement. However, when the crystallinity of the carbon body is increased by a simple high-temperature heat treatment as a conventional technology, not only are nitrogen and sulfur lost, but also micropores are closed, and thus, the specific surface area is rather decreased.

The pickling may be performed by adding the heat-treated product to a 0.5 to 3.5 M acid solution, for example, a 1 to 3 M inorganic acid (hydrochloric acid (HCl), phosphoric acid ($H_3PO_4$), or sulfuric acid ($H_2SO_4$)) and stirring the solution for 1 to 10 hours, preferably 2 to 8 hours, and then the recovered product may be filtered with deionized water and dried to obtain the carbon body, but the present invention is not limited thereto.

Another exemplary embodiment provides a sulfur and nitrogen double doped highly graphitic porous carbon body. The carbon body may have a peak intensity ratio satisfying the following Relations 1 and 2 as measured with a Raman spectrum:

$$0 \leq I_D/I_G \leq 0.95 \quad \text{[Relation 1]}$$

$$0.3 \leq I_{2D}/I_G \leq 3.0 \quad \text{[Relation 2]}$$

wherein $I_D$ is a peak intensity of a D band (at around 1,350 $cm^{-1}$) in a Raman spectrum, $I_G$ is a peak intensity of a G band (at around 1,580 $cm^{-1}$) in the Raman spectrum, and $I_{2D}$ is a peak intensity of a 2D band (at around 2, 700 $cm^{-1}$) in the Raman spectrum.

In Relation 1, $I_D/I_G$ may be preferably 0.8 or less, more preferably 0.7 or less, or 0.6 or less. $I_D$ is a peak representing a defect in the crystal of the carbon body, and graphene is known to be observed near the edge of the specimen or when there are many defects in the sample. $I_G$ is a peak commonly found in a graphite-based material, and is a measure of graphitization crystallinity. Since the carbon body of the present invention satisfies Relation 1, the high crystallinity of the carbon body in the low-temperature carbonization step is secured, and the loss of nitrogen and sulfur may be suppressed. Meanwhile, the lower limit of $I_D/I_G$ may be, for example, 0.1 or more or 0.2 or more.

In relation 2, $I_{2D}/I_G$ may be preferably 0.8 to 1.7, more preferably 0.9 to 1.6. $I_{2D}$ shows a tendency to be inversely proportional to the number of graphene layers, and ideal single-layer graphene which is practically close to the definition shows a peak intensity of $I_{2D}/I_G$ close to 2. Since the present invention corresponds to the range of $I_{2D}/I_G$, the carbon body of the present invention may be graphene formed of less than 5 layers, preferably 1 to 3 layers, and more preferably 1 or 2 layers.

In addition, the carbon body may satisfy the following Relation 3:

$$V_1/V_2 \leq 1.0 \qquad \text{[Relation 3]}$$

wherein $V_1$ is a volume ($cm^3/g$) of micropores of the carbon body, and $V_2$ is a volume ($cm^3/g$) of mesopores of the carbon body.

Specifically, $V_1/V_2 \leq 0.5$ or $V_1/V_2 \leq 0.3$, preferably $V_1/V_2 \leq 0.08$ or $V_1/V_2 \leq 0.05$, and more preferably $V_1/V_2 \leq 0.02$ or $V_1/V_2 \leq 0.01$.

Generally, the micropore refers to a pore having a size of 2 nm or less, and the mesopore refers to a pore having a size of 2 to 50 nm. The pores formed on the surface and the inside of the carbon body are a kind of defect and means low crystallinity. In addition, the specific surface area is increased by pore formation, and in particular, micropores having a smaller pore size has a greater effect than mesopores. In the case of the present invention, since fewer micropores are formed by increasing the crystallinity of the carbon body and more mesopores are formed by a pickling process, the specific surface area is somewhat small as compared with the conventional technology, but mesopores are increased, which is thus more favorable in terms of mass transfer in an application reaction and may secure the crystallinity of the carbon body. Specifically, it is favorable for movement and transfer of a reactant, an intermediate, and a product in an oxygen reduction reaction and a hydrogen generation reaction, and in particular, when a catalyst material such as Pt, Rh, Ru, Mo, Co, and Ni is supported, the access of a reactant (water, $OH^-$ ion in a water electrolysis reaction) is facilitated and the release of a product (hydrogen gas) is facilitated. The mesopores have a greater effect on the material transfer in the application reaction as such than the micropores.

Meanwhile, the carbon body may have a total pore volume of 0.3 to 2.0 $cm^3/g$, a micropore volume of 0.001 to 0.06 $cm^3/g$, a mesopore volume of 0.3 to 1.8 $cm^3/g$, and an average pore size of 10 to 50 nm, and more preferably, a total pore volume of 0.5 to 2.0 $cm^3/g$, a micropore volume of 0.005 to 0.050 $cm^3/g$, a mesopore volume of 0.5 to 1.9 $cm^3/g$, and average pore size of 15 to 40 nm. In addition, the carbon body may have a BET specific surface area of 80 to 1000 $m^2/g$, preferably 100 to 700 $m^2/g$, and more preferably 150 to 500 $m^2/g$.

Meanwhile, the BET specific surface area is calculated using a Brunauer-Emmett-Teller method based on the results of nitrogen adsorption at a relative pressure in a range of 0.05 to 0.2, and the total pore volume is calculated from a gas adsorption amount at a relative pressure of 0.99. In addition, the mesopore size is measured by a Barrett-Joyner-Halenda method based on a Kelvin equation, and the mesopore volume is analyzed using the amount of adsorbed nitrogen at a relative pressure of 0.95 or less.

The carbon body may include 0.3 to 6.0 atom % of N and 0.1 to 3.0 atom % of S as heteroelements. Preferably, the carbon body may include 0.6 to 4.0 atom % of N and 0.1 to 1.0 atom % of S. Since nitrogen and sulfur doping is a kind of defect of the carbon body, when a doping amount is large, crystallinity is decreased to lower electrical conductivity. For electrochemical application, a balance between the doping degree of heteroelement and the crystallinity of carbon body is needed, and it is preferred that the heteroelements N and S are included in the above range. In addition, in the present invention, the kind and the content of metal powder are adjusted, thereby allowing qualitative improvement.

Meanwhile, the carbon body may include binding states of pyrrolic N, graphitic N, pyridinic N, or a combination thereof; 10 atom % or more, preferably 30 atom % or more, and more preferably 50 atom % or more with respect to 100 atom % of the nitrogen (N) as a heteroelement is present as a binding state of pyrrolic N, as a non-limiting example, the upper limit may be 75 atom % or less, 70 atom % or less, or 60 atom % or less, graphitic N may be 50 atom % or less, and pyridinic N may be 20 atom % or more, preferably 50 atom % or more, and more preferably 60 atom % or more. In particular, since the unshared electron pair of the pyrrolic N is not involved in aromatic stabilization, it has lower binding energy than graphitic N, pyridinic N, and the like. Since the present invention has a higher ratio of pyridinic N in the doped N, the crystallinity of the nitrogen doped carbon body may be improved and the activity of the oxygen reduction reaction and the hydrogen generation reaction may be improved. However, the relative ratio of N species may be varied with a carbonization temperature, a time, and used metal powder.

Another exemplary embodiment provides an electrode catalyst for a fuel cell and/or a water electrolysis reaction including the carbon body. The carbon body may be characterized by having platinum (Pt), rhodium (Rh), ruthenium (Ru), nickel (Ni), cobalt (Co), iron (Fe), palladium (Pd), copper (Cu), iridium (Ir), osmium (Os), molybdenum (Mo), vanadium (V), silver (Ag), gold (Au), and the like, or a combination thereof supported on the surface and the inside.

The water electrolysis reaction is a technology of producing hydrogen and oxygen from pure water using electric energy, and is largely classified into alkaline water electrolysis, solid polymer electrolyte membrane (PEM) water electrolysis, and high-temperature water vapor electrolysis using a solid oxide, and the sulfur and nitrogen double doped highly graphitic porous carbon body of the present invention may be used as an electrode catalyst for a water electrolysis reaction as well as an electrode catalyst for a fuel cell.

Hereinafter, the preferred examples and the comparative examples of the present invention will be described. However, the following examples are only a preferred exemplary embodiment of the present invention, and the present invention is not limited thereto.

Example 1

Examples 1-1 to 1-4

30 g of urea was added to an alumina crucible, the crucible was sealed, and a heat treatment at a heating rate of 3.5° C./min at 550° C. for 4 hours under an air atmosphere was performed to obtain g-$C_3N_4$. The obtained g-$C_3N_4$ was mixed with an equal amount of Mg powder, the well-mixed powder was added to the alumina crucible, and a heat treatment was performed at X° C. (650° C., 750° C., 850° C., and 950° C.) according to each example for 5 hours in a furnace under an argon (Ar), nitrogen ($N_2$), or $H_2$/Ar mixed gas flow atmosphere. Subsequently, the heat-treated product was added to a 2 M HCl solution, and stirring was performed for 5 hours to perform acid leaching. The recovered product was filtered with deionized water and dried to obtain a nitrogen-doped highly graphitic porous carbon body.

Comparative Examples 1-1 and 1-2

The process was performed in the same manner as in Example 1-1, except that the obtained g-$C_3N_4$ was added to an alumina crucible and the heat treatment was performed in a furnace under the atmosphere according to each comparative example ($H_2$/Ar 5/95 vol %, Ar 100 vol %).

Comparative Examples 1-3 and 1-4

The process was performed in the same manner as in Example 1-4, except that the obtained g-$C_3N_4$ was added to an alumina crucible and the heat treatment was performed in a furnace under the atmosphere according to each comparative example ($H_2$/Ar 5/95 vol %, Ar 100 vol %).

Hereinafter, the nitrogen-doped highly graphitic porous carbon bodies of Examples 1-1 to 1-4 are indicated as CNMg-650, CNMg-750, CNMg-850, and CNMg-950, and the carbon bodies of Comparative Examples 1-1 to 1-4 are indicated as CNH-650, CNAr-650, CNAr-950, and CNH-950.

Evaluation Example

[Evaluation Method]

In order to analyze the produced porous carbon body, X-ray diffraction analysis was performed at 40 kV, 30 mA, and a scan rate of 4°/min, using a Cu-Kα (A=0.15406 nm) ray, using Rigaku Smartlab X-ray diffraction apparatus.

Fourier transform infrared (FT-IR) spectrum was obtained using NICOLET CONTINUUM.

Transmission electron microscope (TEM EM912 Omega) observation was performed at 120 kV, and a JEOL FE-2010 microscope operated at 200 kV was used to obtain high resolution TEM (HR-TEM) and a STEM image. Scanning electron microscope (SEM) observation was performed using a Hitachi S-4700 microscope operated at an acceleration voltage of 10 kV.

Nitrogen adsorption-desorption isotherms were measured at −196° C. by degassing a sample at 150° C. at 20 mTorr for 12 hours and then using a Micromeritics ASAP 2460 acceleration surface area and porosity analyzer.

A BET specific surface area was calculated using a Brunauer-Emmett-Teller (BET) method based on the nitrogen adsorption results at a relative pressure in a 0.05 to 0.2 range.

Raman analysis was performed using a Raman spectrometer (NICOLET ALMECA XR, available from Thermo Scientific). A 532 nm laser beam was used.

X-ray photoelectron spectroscopy (XPS) analysis was performed using an ESCALAB 250 XPS system using a monochromatic Al Kα (150 W).

Metal loading amounts in all samples and thermal reactions were measured by thermogravimetric analysis (TGA) using a Bruker TGDTA2000SA analyzer.

Electrical conductivity was measured using pressurized 4-probe measurement equipment using Keithley 6220 and 2182A with a DC current source and a voltmeter.

2.5 mg of a Pt-supported porous carbon body produced by supporting Pt by various methods such as Homogeneous deposition and $NaBH_4$ was added to 0.5 ml of a mixed solvent (solvent of 5 wt % of a Nafion aqueous solution: isopropanol:water mixed at a volume ratio of 0.8:1.0:4.0), and then ultrasound was applied for 15 minutes to produce a catalyst ink. Thereafter, 4 μL of the catalyst ink was applied on the surface of a working electrode and dried at 45° C. to produce a catalyst electrode having 0.283 mg/cm$^2$ of a catalyst (porous carbon body) loaded.

For comparison, in the production of the catalyst ink, 2.5 mg of a commercially purchased Pt/C catalyst (20 wt % of Pt on ketjen black, Tanaka Kikinzoku Kogyo Co., hereinafter, referred to as commercial Pt/C catalyst), or Pt/CNH, Pt/CNAr, or Pt/g-$C_3N_4$ of Comparative Examples 1 and 2 was used instead of 2.5 mg of the Pt-supported porous carbon body to produce a commercial catalyst ink, which was applied on the working electrode as described above to produce a commercial catalyst electrode.

All electrochemical measurements were performed in a 3-electrode cell at room temperature. A KCl-saturated Ag/AgCl and a platinum wire were used as a reference electrode and a counter electrode. A rotating disk electrode (RDE) and a rotating ring disk electrode (RRDE) on which a catalyst was loaded as a working electrode were measured in an acid electrolyte of a $O_2$-saturated chloric acid ($HClO_4$) aqueous solution.

All potentials were measured with a reversible hydrogen electrode (RHE), and for this, an Ag/AgCl reference electrode was calibrated for RHE.

A vitreous carbon RDE having a diameter of 3 mm coated with Pt/CNMg-X or commercial Pt/C (Tanaka, 20 wt % Pt on ketjen black) produced was used as the working electrode. As the catalyst ink, a dispersion of a catalyst corresponding to 5.0 mg of a mixture of 0.1 ml of a 5% Nafion solution (Sigma Aldrich) and 0.9 ml of deionized water was produced. The dispersed ink was cast on the vitreous carbon electrode, and dried in an oven at 60° C. The Pt loading amount of the electrode was about 50 μg/cm$^2$.

Cyclic voltammetry (CV) was measured in a $N_2$ saturated 0.1 M $HClO_4$ solution for ORR under acidic conditions at room temperature, in a range of +1.1 to −0.2 V (vs. RHE) at a scan rate of 50 mV/s.

RDE and RRDE measurements were performed with linear sweep voltammetry (LSV) curves in an $O_2$-saturated 0.1 M $HClO_4$ solution. The LSV curve for ORR was measured at 1600 rpm, +1.0 to −0.2 V, and a scan rate of 10 mV/s under acidic conditions, and Pt ring potential was measured at +1.1 V set potential.

* Membrane Electrode Assemblies (MEA) and Single Cell Test

A membrane electrode assembly was produced using a catalyst coated membrane (CCM) having an active area of 10 cm$^2$. In the fuel cell test, commercial Pt/C (Tanaka, 20 wt % Pt on ketjen black) was used as an anode catalyst, and synthesized Pt/CNMg-X and a commercial Pt/C catalyst were used as an active cathode electrode. All catalyst inks were formed of catalyst powder, 2-propanol, deionized water, and 5 wt % of a Nafion solution (Sigma Aldrich). A well-dispersed catalyst slurry was directly sprayed on a Nafion N211 membrane to produce CCM, which was dried at 60° C. for several hours. A catalyst loading amount was 0.12 mgPt/cm$^2$ in all electrodes. A membrane electrode assembly was assembled in a commercial gas diffusion layer (GDL, SGL 39 BC) without hot-pressing, and performance of a polymer electrolyte membrane fuel cell (PEMFC) was evaluated under the conditions of supplying fully humidified $H_2$ and 02 at 80° C. to a positive electrode and a negative electrode at a flow rate of 500 and 1200 mL, respectively. A back pressure during evaluation was maintained at 0.5 bar.

A polarization curve for the membrane electrode assembly was performed by an electronic load (PLZ664WA, Kikusui) with PEMFC test station (Scitech Inc., Korea) under constant current.

Impedance spectroscopy (electrochemical impedance spectroscopy, EIS) was performed at 5 kHz~100 mHz at a cell current of 100 $mA/cm^2$. A back pressure during evaluation was maintained 0.5 bar.

In order to measure the electrochemical active surface area of the prepared cathode catalyst, CV was obtained at 0.1 to 1.2 V at a scan rate of 50 mV/s. Potentiostat (Bio-Logic, SP-150) coupled with a booster (VMP3B-20) was used, and at this time, fully humidified $H_2$ (100 sccm) and $N_2$ (50 sccm) at 80° C. under the atmosphere was injected to a negative electrode and a positive electrode, respectively.

For evaluation of electrode catalyst durability, an accelerated durability test (ADT) was performed in accordance with the standard of department of energy (DOE). According to the electrocatalyst cycle protocol, a quadrangle voltage cycling test was performed between 0.6 V and 0.95 V for a maintenance time of 3 seconds at potentials on both sides. After 10 k, 20 k, and 30 k cycles, a polarization curve, a cyclic voltammetry (CV), and impedance spectroscopy (EIS) were obtained.

For evaluation of catalyst support durability, an accelerated durability test (ADT) was performed in accordance with the standard of department of energy (DOE). According to the cycle protocol of the catalyst support, a triangular voltage cycling test was performed between 1.0 V and 1.5 V at a scan rate of 500 mV/s. After 5 k cycles, a polarization curve, a cyclic voltammetry (CV), and impedance spectroscopy (EIS) were obtained.

Evaluation Example 1

[Evaluation Example 1-1] Results of Analyzing Properties Such as High Crystallinity of Produced Carbon Body In FIG. 1, (a) is a schematic diagram showing a synthesis process of a nitrogen-doped highly graphitic porous carbon body according to an exemplary embodiment of the present invention, (b) is a graph showing the results of X-ray diffraction (XRD) spectroscopy analysis for the products of each step (corresponding in order from bottom to top of the graph), in the production of the nitrogen-doped carbon body according to Example 1-1, and (c) is a graph showing a Raman spectrum analysis of a nitrogen-doped highly graphitic porous carbon body (CNMg-650) as the final product.

In (b) of FIG. 1, upon comparison of XRD analysis of g-$C_3N_4$ with CNMg-650, i) it was found that in-plane structural packing was removed by the removal of a (0001) plane peak, so that the graphite structure of g-$C_3N_4$ was changed to a graphene structure, and ii) the position of a (002) plane peak was shifted from 27.5° to 26° (XRD peak shifting), so that the main composition of the final product was changed.

From (c) of FIG. 1, graphiticity and the number of graphenes formed may be confirmed. i) the peak intensity ratio $I_D/I_G$ of the Raman spectrum was calculated as 0.57, and it was found that by having a relatively low peak intensity ratio, a graphiticity is in a very high level and a crystallization degree is relatively high. ii) the Raman spectrum peak intensity ratio $I_{2D}/I_G$ was calculated as 0.91, and it was found that the final product was formed of a total of two graphene layers on average.

To sum up, when the nitrogen-doped highly graphitic porous carbon body was produced by the production method of the present invention, as in the schematic diagram of the synthesis process of (a) of FIG. 1, (b) a peak (2theta=25°, 26°) which is newly shown may be confirmed in the XRD analysis results, and it was confirmed that (c) the new peak shows that the final product was in a very high graphiticity level and was formed of about two graphene layers, from the results of calculating the Raman spectrum peak intensity ratios, $I_D/I_G$ and $I_{2D}/I_G$.

In the following Table 1, the results (see (b) of FIG. 5) of analyzing the Raman spectra of the products produced by the production method of the present invention (Examples 1-1 to 1-4) are summarized.

TABLE 1

| Sample | $I_D/I_G$ | $I_{2D}/I_G$ | The number of graphene layers |
|---|---|---|---|
| CNMg-650 | 0.57 | 1~0.91 | >2 |
| CNMg-750 | 0.50 | 1.24 | 1-2 |
| CNMg-850 | 0.26 | 1.50 | 1-2 |
| CNMg-950 | 0.21 | 1.54 | 1-2 |

Figure 2:
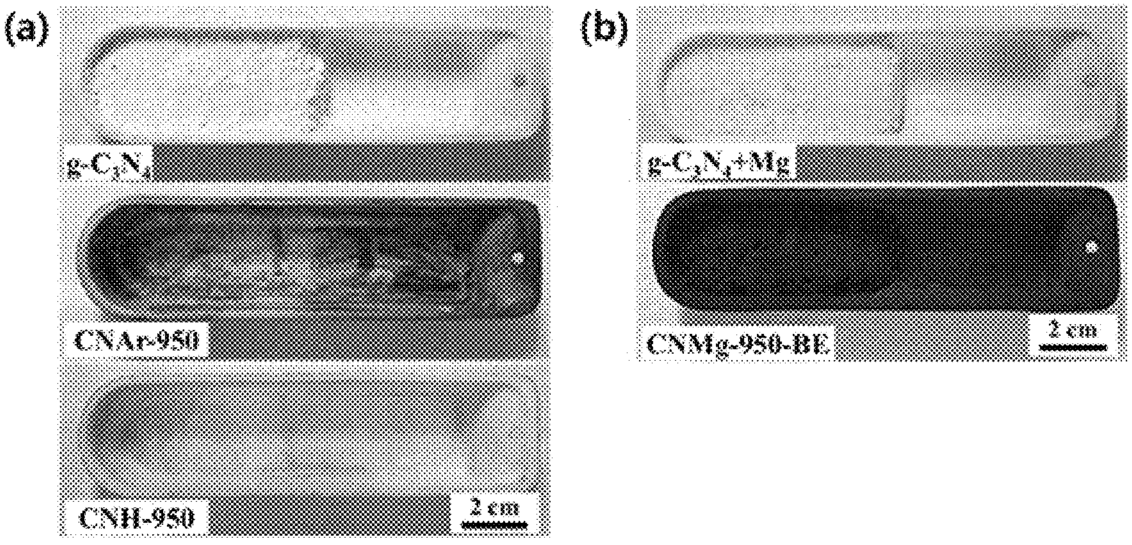
FIG. 2 is photographs of (a) 2 g of a polymer (g-$C_3N_4$), and Comparative Example 1-3 (CNAr-950) and Comparative Example 1-4 (CNH-950) which were heat-treated in a furnace under the atmosphere ($H_2$/Ar 5/95 vol %, Ar 100 vol %) according to the comparative examples, and (b) a mixture of 2 g of the polymer (g-$C_3N_4$) and 2 g of Mg, and CNMg-950-BE which was heat-treated in a furnace under an inert atmosphere (Ar 100 vol %), respectively.

Meanwhile, in the case of the products produced in Comparative Examples 1-1 to 1-3, since CNH-650 and CNAr-650 maintained g-$C_3N_4$, $I_D$ and $I_G$ peaks were not able to be confirmed like g-$C_3N_4$. In addition, it was confirmed that CNAr-950 and CNH-950 were almost all decomposed, so that it was difficult to recover the samples (see FIG. 2), Raman spectrum analysis was not carried out, and it was difficult to use them as a carbon body catalyst for a fuel cell.

Figure 3:
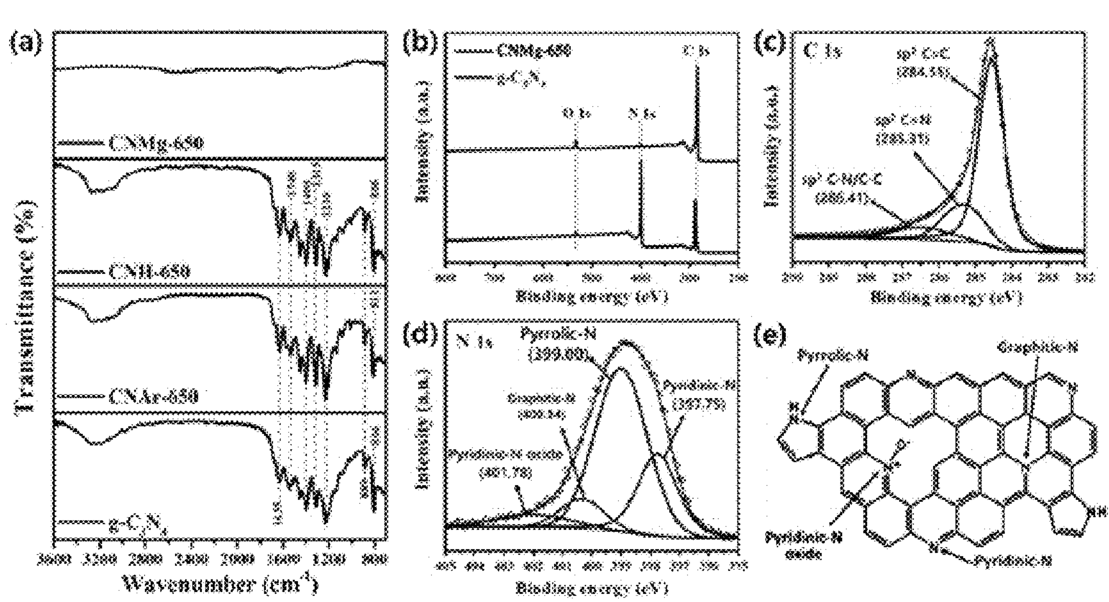
In FIG. 3, (a) is a graph showing the results of FT-IR spectra for Example 1-1 (CNMg-650), Comparative Example 1-1 (CNH-650), Comparative Example 1-2 (CNAr-650), and the polymer (g-$C_3N_4$), (b), (c), and (d) are graphs showing the results of XPS (O 1s, N 1s, C 1s) of CNMg-650 (highly graphitic nitrogen porous carbon body) produced in Example 1-1, and (e) is a schematic diagram of nitrogen-doped graphene, respectively.

[Evaluation Example 1-2] Results of Analyzing Chemical Structure and the Like of Produced Nitrogen-Doped Carbon Body In FIG. 3, (a) is a graph showing the results of FT-KR spectra for Example 1-1 (CNMg-650), Comparative Example 1-1 (CNH-650), Comparative Example 1-2 (CNAr-650), and a bulk graphite type polymer (g-$C_3N_4$), (b), (c), and (d) are graphs showing the results of XPS (O 1s, N 1s, C 1s) of CNMg-650 (nitrogen porous carbon body) produced in Example 1-1, and (e) is a schematic diagram of nitrogen-doped graphene, respectively. The binding state of heteroelement N in the carbon body was recognized.

In (a) of FIG. 3, i) a broad peak in a wavenumber range of 3500-3000 $cm^{-1}$ shown in CNH-650, CNAr-650, and g-$C_3N_4$ refers to N—H stretching by the incomplete condensation of an amino group, and since the peak was not shown in CNMg-650, it was found that the incomplete condensation did not relatively occur in forming the carbon body. ii) The peaks in a wavelength range of 806 $cm^{-1}$ and 811 $cm^{-1}$ refer to N—H bending, N—H out-of-plane bending in tri-s-triazine (forming g-$C_3N_4$), and O—H vibration of water, the peaks in a wavenumber range of 1700 to 1200 $cm^{-1}$ refer to a C—N heterocycle, and the peaks in a wavenumber range of 1540 $cm^{-1}$, 1315 $cm^{-1}$, and 1230 $cm^{-1}$ are stretching vibration of $sp^3$ hybrid C—N and $sp^2$ hybrid C═N, and C—NH—C bonding in tri-s-triazine with an amino substituent. That is, it means that even after a heat treatment at 650° C., CNH-650 and CNAr-650 contained the chemical structure of g-$C_3N_4$ before the heat treatment. However, in Example 1-1, since those peaks were not shown, and only a peak at 1627 $cm^{-1}$ which was a $sp^2$ hybrid C═C vibration was shown, the chemical structure was changed after the polymer heat treatment, and this is meaningful in that the examples of the present invention are different from g-$C_3N_4$, CNH-650, and CNAr-650.

In (b) of FIG. 3, CNMg-650 had increased peaks of O and C elements and a decreased N element, as compared with g-$C_3N_4$. The content ratio of each carbon body was calculated from the peaks of O, C, and N elements of g-$C_3N_4$, CNH-650, CNAr-650, CNMg-X, and the results are shown in the following Table 2.

TABLE 2

| Sample | C 1s (at %) | N 1s (at %) | O 1s (at %) | Cl 2p (at %) |
|---|---|---|---|---|
| g-$C_3N_4$ | 47.15 | 50.9 | 1.95 | — |
| CNH-650 | 46.05 | 52.41 | 1.41 | — |
| CNAr-650 | 49.41 | 48.49 | 2.1 | — |
| CNMg-650 | 93.3 | 2.67 | 4.03 | 0 |
| CNMg-750 | 95.35 | 1.93 | 2.6 | 0.11 |
| CNMg-850 | 96.05 | 1.29 | 2.48 | 0.18 |
| CNMg-950 | 96.04 | 0.90 | 3 | 0.06 |

From Table 2 and (b) of FIG. 3, it was found that in Examples 1-1 to 1-4, since magnesium melted in the heat treatment at 650° C. covered the entire g-$C_3N_4$ and formed $Mg_3N_2$, the ratio present in the carbon body as a heteroelement was lowered to a doping level of about 3%.

TABLE 3

| | Binding state of doped nitrogen in carbon body (ratio % relative to total doped N) | | | | | | |
|---|---|---|---|---|---|---|---|
| Sample | Pyrrolic N | Pyridinic N | Graphitic N | Pyridinic N-oxide | $sp^2$ N—C | C—$NH_2$ | N—H |
| g-$C_3N_4$ | 0 | 0 | 0 | 0 | 66.02 | 22.14 | 11.84 |
| CNAr-650 | 0 | 0 | 0 | 0 | 64.63 | 24.11 | 11.26 |
| CNH-650 | 0 | 0 | 0 | 0 | 59.44 | 26.83 | 13.73 |
| CNMg-650 | 58.69 | 25.53 | 9.09 | 6.69 | 0 | 0 | 0 |

From Table 3, and (c) and (d) of FIG. 3, it was found that in Example 1-1, with respect to 100 at %, more than a half (58.67%) was present as pyrrolic N, and 25.53%, 9.09%, and 6.69% were bonded to the nitrogen-doped carbon body as pyridinic N, graphitic N, and pyridinic N-oxide, respectively. Meanwhile, it is known that since the electron pair of the pyrrolic N is involved in aromatic stabilization, it has higher binding energy than graphitic N, pyridinic N, and the like. Referring to Table 3 and (c) of FIG. 2, considering that the ratio of pyrrolic N is high, the crystallinity of the nitrogen-doped carbon body may be improved and the oxygen reduction activity may be improved. However, from Table 3, it was confirmed that Comparative Example 1-2 (CNAr-650) and Comparative Example 1-1 (CNH-650) had the same structure as g-$C_3N_4$, which was in a different binding state from the doped nitrogen on a basic carbon skeleton, and thus, had a different tendency from Example 1-1 (CNMg-650), and the doped N element did not have the binding state such as pyrrolic N, pyridinic N, and graphitic N.

Figure 4:
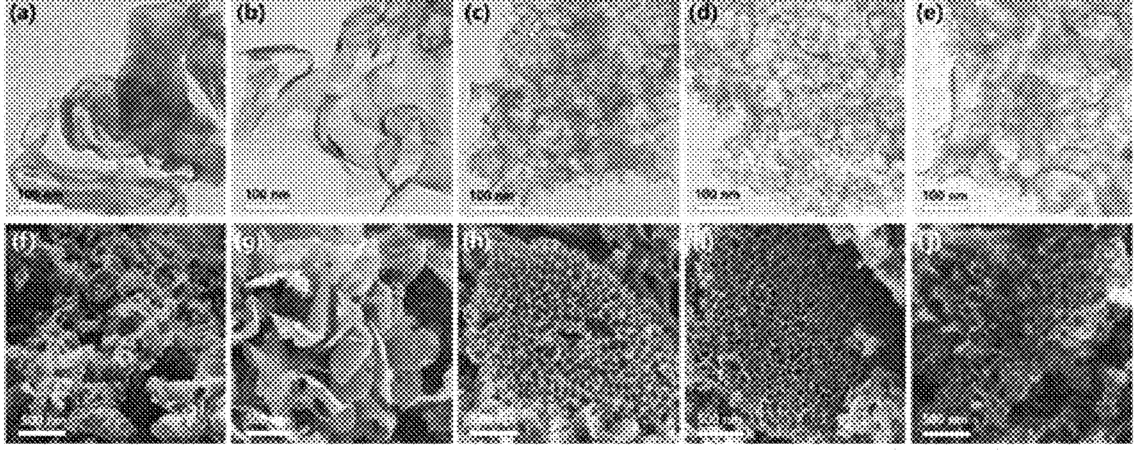
In FIG. 4, (a) to (e) are TEM images of the polymer (g-$C_3N_4$), and the nitrogen-doped highly graphitic porous carbon bodies produced in Examples 1-1 to 1-4, and (f) to (j) are SEM images.

[Evaluation Example 1-3] Results of Analyzing Porosity and BET Specific Surface Area Properties of Produced Carbon Body (a) to (e) of FIG. 4 are TEM images of g-$C_3N_4$, CNMg-650, CNMg-750, CNMg-850, and MgCN-950, and (f) to (j) of FIG. 4 are SEM images thereof. In the following Table 4, the BET specific surface area, the average pore size, the pore volume, and the like of the produced carbon body are summarized.

TABLE 4

| Sample | BET surface area ($m^2/g$) | Total pore volume ($cm^3/g$) | Micropore volume ($cm^3/g$) | Mesopore volume ($cm^3/g$) | Average pore diameter (nm) |
|---|---|---|---|---|---|
| g-$C_3N_4$ | 64.08 | 0.2881 | 0.0035 | 0.2846 | 19.36 |
| CNAr-650 | 81.83 | 0.2078 | 0.0189 | 0.1889 | 20.59 |
| CNH-650 | 105.83 | 0.4310 | 0.0145 | 0.4165 | 23.43 |
| CNMg-650 | 375.58 | 0.8317 | 0.0173 | 0.8144 | 8.17 |
| CNMg-750 | 355.33 | 1.2542 | 0.0100 | 1.2442 | 11.75 |
| CNMg-850 | 288.64 | 1.2968 | 0.0020 | 1.2948 | 12.67 |
| CNMg-950 | 251.30 | 0.9902 | 0.0031 | 0.9871 | 12.71 |

From Table 4 and FIG. 4, it was confirmed that in the present invention, mesopores were formed in the sites from which $Mg_3N_2$ and residual Mg powders were removed by acid etching, and the BET specific surface area of the carbon body was increased. However, when the heat treatment temperature was raised in the temperature range of 650 to 950° C., micropores were decreased to rather decrease the BET specific surface area of the carbon body. That is, the preferred heat treatment temperature range to optimize the crystallinity of the BET specific surface area of the carbon body was analyzed to be 600 to 750° C.

Figure 5:
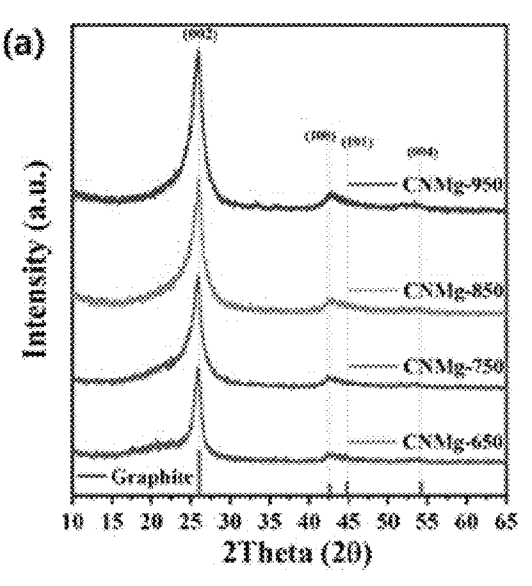
In FIG. 5, (a) is a graph showing the results of X-ray diffraction (XRD) spectroscopy analysis depending on a heat treatment temperature of the porous carbon body (CNMg-X) produced in the example, and (b) is a graph showing Raman spectrum analysis of the nitrogen-doped highly graphitic porous carbon body (CNMg-X).
Figure 5:
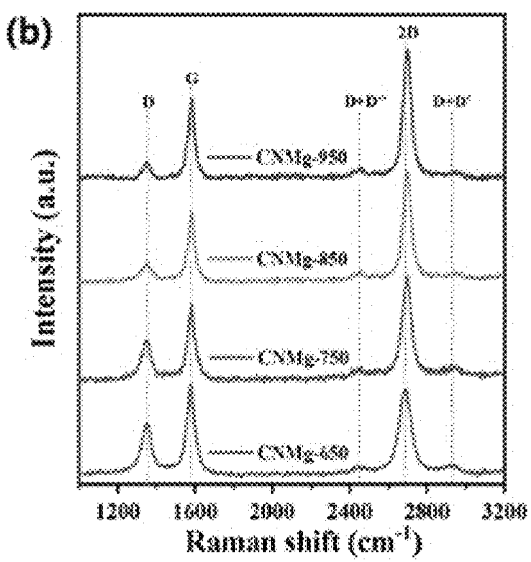

FIG. 5 is graphs showing the results of X-ray diffraction (XRD) spectroscopy analysis and the Raman spectrum analysis of CNMg-650, CNMg-750, CNMg-850, and CNMg-950. From (a) of FIG. 5, it is shown that the (002) plane peak was sharper and large with a rising heat treatment temperature. Referring to (b) of FIG. 5 and Table 1, as the treatment temperature rose, the size of $I_D$ was smaller and $I_G$ and $I_{2D}$ were larger.

[Evaluation Example 1-4] Evaluation of Electrochemical Performance and PEMFC Durability

* Evaluation of Electrical Conductivity of Porous Carbon Body

Figure 6:
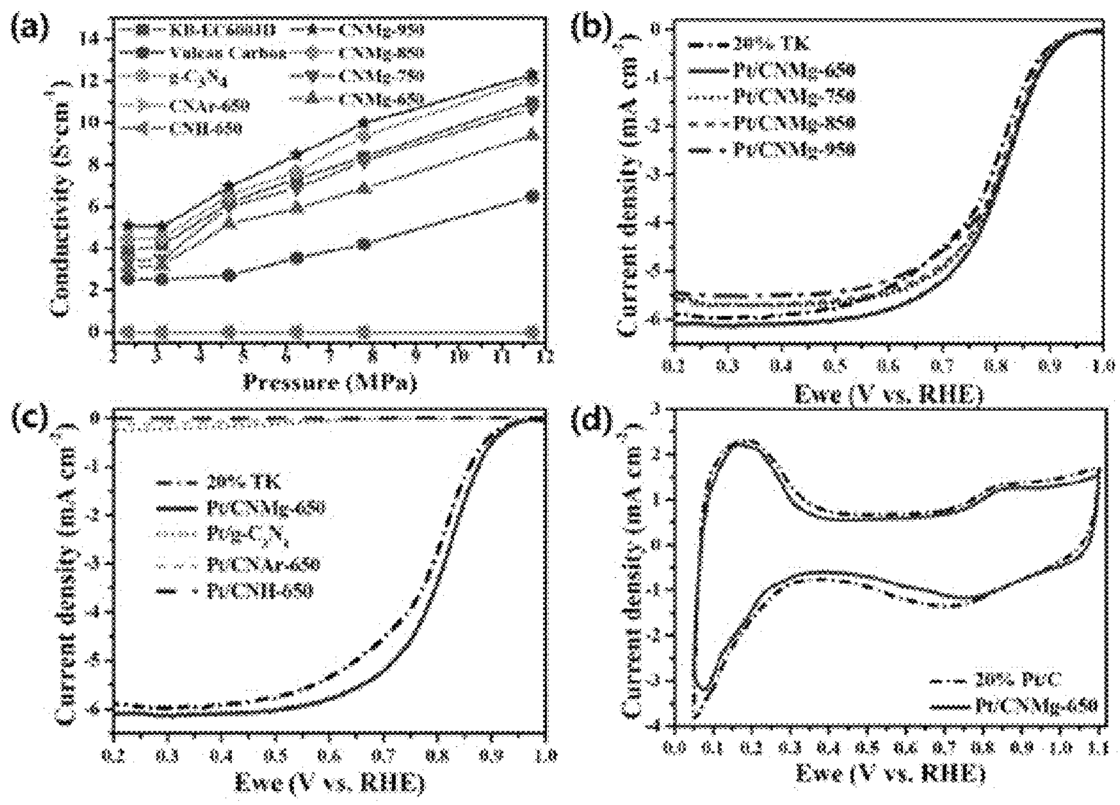
In FIG. 6, (a) shows electrical conductivity depending on pressurized pressure of a porous carbon body produced in the examples and the comparative examples depending on pressurized pressure, and (b), (c), and (d) show the porous carbon bodies of the examples and the comparative examples, and linear sweep voltammetry (LSV) curves and cyclic voltammetry (CV) curves of rotating disk electrodes (RDE) using Pt as a catalyst.

The electrical conductivities of the porous carbon bodies of Examples 1-1 to 1-4, Comparative Examples 1-1 and 1-2, a bulk graphite type polymer (g-$C_3N_4$), Reference 1 (KB-EC600JD, LION SPECIALTY CHEM CO., LTD), and Reference 2 (Vulcan carbon, CABOT) depending on the pressurized pressure were measured, and the results are shown in (a) of FIG. 6.

Referring to (a) of FIG. 6, all samples showed a tendency of electrical conductivity increased in proportion to the pressurized pressure. From the results of the electrical conductivity of the carbon bodies of Examples 1-1 to 1-4, it was found that a tendency of electrical conductivity increased in proportion to each of the temperature when heat-treating the mixture of the bulk graphite-type polymer and magnesium powder and the crystallinity (graphiticity) of the produced carbon body was shown. In Comparative Examples 1-1 and 1-2, it was analyzed that since the magnesium powder was not mixed, and also, the heat treatment temperature was 650° C. which was low, the crystallinity of the carbon body was significantly low as compared with Examples 1-1 to 1-4, and thus, the electrical conductivity of the present experiment was not able to be substantially measured. g-$C_3N_4$ which was not heat-treated was also the same.

In addition, all of the porous carbon bodies of Examples 1-1 to 1-4 had significantly higher electrical conductivity than a commercial carbon black product (Reference 2, Vulcan carbon), and Examples 1-3 and 1-4 of these showed higher performance than ketjen black (Reference 1, KB-EC600JD) which is known as a carbon body having high electrical conductivity, which are thus meaningful.

* ORR Performance Evaluation

From (b) to (d) of FIG. 6, Examples 1-1 to 1-4 having 20 wt % of Pt supported thereon all showed high onset potential and half-wave potential, and showed ORR activity properties similar to 20 wt % commercial Pt/C. However, Comparative Examples 1-1 and 1-2, and Pt/g-$C_3N_4$ had very low activity even with 20 wt % of Pt supported thereon as compared with the commercial catalyst. This is considered that since the materials of the comparative examples had very low electrical conductivity, they did not function as an electrode. Meanwhile, it was observed that the carbon structure carbonized at a high temperature of 650° C. or higher had a lower diffusion limiting current density for the Pt/CNMg-X (X=750-950) sample than commercial Pt/C. That is, it was confirmed that Pt/CNMg-650 showed the best properties among the synthesized catalysts, in the diffusion limiting current density as well as onset potential and half-wave potential. In addition, the CV curve of Pt/CNMg-650 also showed a hydrogen adsorption desorption curve similar to commercial Pt/C.

* Evaluation of Single Cell Performance and Durability (Evaluation of Durability of Supported Platinum)

Figure 7:
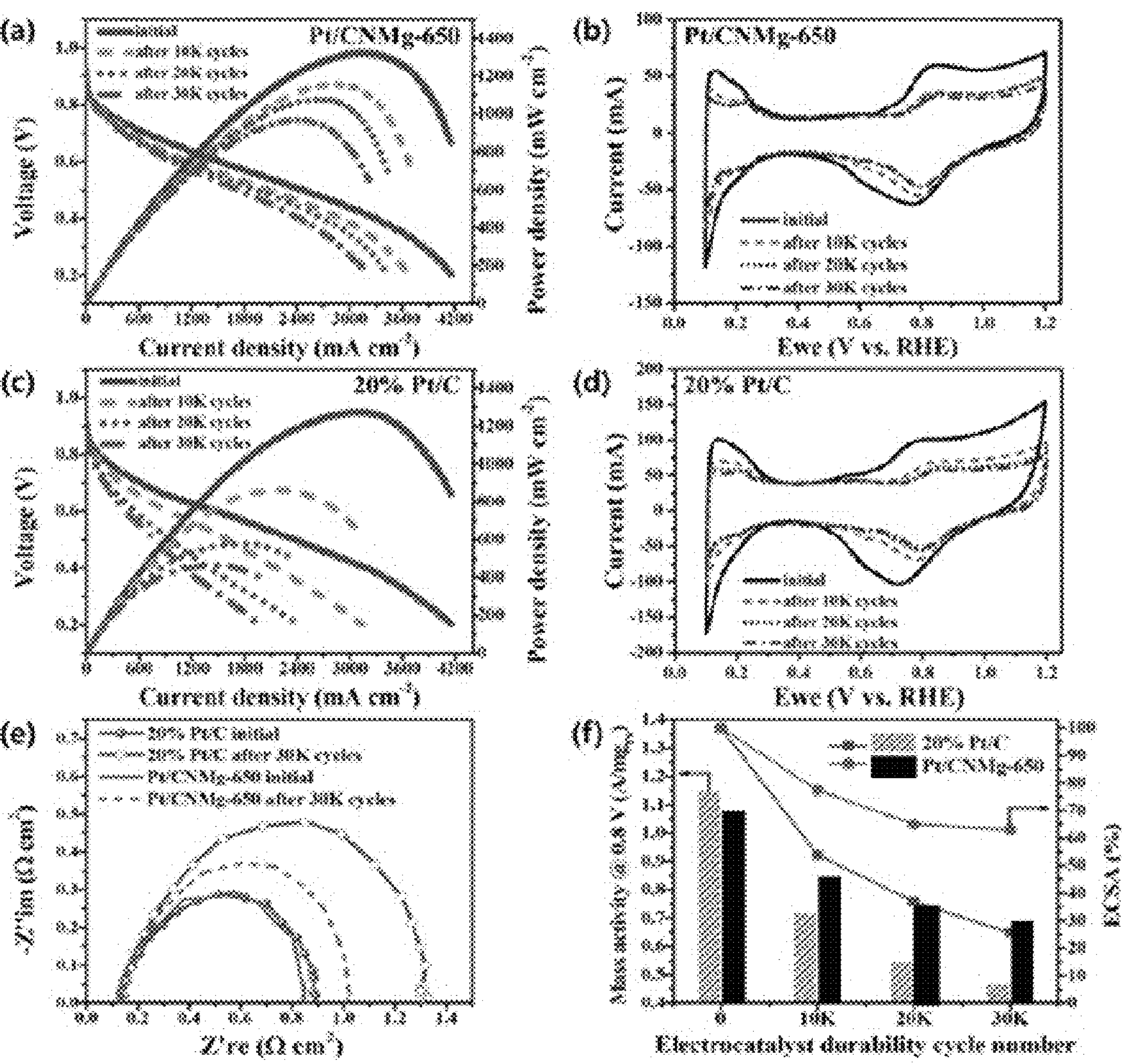
FIG. 7 shows the results of stability evaluation cycles of platinum catalysts, in which single cell polarization and output density curves are shown for (a) Example 1-1 (Pt/CNMg-650) and (c) commercial 20% Pt/C, respectively, CV curves each at 10 k cycles are shown for (b) Example 1-1 (Pt/CNMg-650) and (d) commercial 20% Pt/C, respectively, (e) electrochemical impedance spectroscopy curves are illustrated for comparison for Example 1-1 and commercial 20% Pt/C before and after 30 k cycles (@ 100 mA/$cm^2$), and (f) mass activation at 0.8 V calculated from CV and polarization curves and normalized electrochemical surface area (ECSA) are illustrated.

An accelerated durability test (ADT) is to test the stability of supported platinum of an electrocatalyst, and according to Evaluation Example 1, the test was performed with the protocol suggested by U.S. Department of Energy (DOE). Referring to (a) and (c) of FIG. 7, the maximum power density ($P_{max}$) of Example 1-1 and commercial Pt/C was shown as 1325 mW/$cm^2$ and 1275 mW/$cm^2$, respectively, and as ADT proceeded, $P_{max}$ of commercial Pt/C was rapidly decreased, but $P_{max}$ of the example was gradually decreased. In particular, the mass activity (@0.8 V) of Example 1-1 after 10 k cycles was gradually decreased, and after 30 k cycles, 0.69 A/$mg_{Pt}$ or more was maintained (65% activity of initial performance maintained), but the mass activity of commercial Pt/C was rapidly decreased, and after 30 k cycles, it was decreased to 0.47 A/$mg_{Pt}$ with 41% activity of initial performance maintained. These results mean that the catalyst of Example 1-1 was based on a high crystalline support and was far more stable in terms of the size of Pt, dispersibility, and the like during the durability reaction than commercial Pt/C. That is, it means that by using a nitrogen-doped carbon body containing a high ratio of pyrrolic N as a carrier, pyrrolic N was strongly bound to Pt of the Pt/carbon body catalyst to improve Pt stability. These results may be also confirmed in CV and ECSA evaluations. In Example 1, the hydrogen absorption/desorption peak area (@CV) was smaller in the CV curve than commercial Pt/C ((b) and (d) of FIG. 7), but an activity decrease was gradual as compared with Pt/C, and thus, the ECSA value of Example 1 was higher after 20 k cycles ((f) of FIG. 7 and Table 5). In normalized ECSA, commercial Pt/C was more sharply decreased during the cycle progress. These results show that Example 1-1 was more effective in Pt utilization in terms of substantial long-term life operation (see Table 5 below).

TABLE 5

| Catalyst | Cycle number | $P_{max}$ (mW/$cm^2$) | Mass activity (A/$mg_{Pt}$) | V @ 0.8 A/$cm^2$ (V) | ECSA ($m^2$/$g_{Pt}$) | Rct @ 0.1 A/$cm^2$ ($\Omega$ $cm^2$) |
|---|---|---|---|---|---|---|
| 20% Pt/C | initial | 1275 | 1.15 | 0.67 | 66.4 | 0.77 |
| | 10 k | 870 | 0.72 | 0.62 | 35.8 | 0.95 |
| | 20 k | 580 | 0.55 | 0.54 | 24.5 | 1.11 |
| | 30 k | 465 | 0.47 | 0.50 | 17.0 | 1.1 |
| Pt/CNMg-650 | initial | 1325 | 1.07 | 0.69 | 42.0 | 0.73 |
| | 10 k | 1160 | 0.85 | 0.65 | 32.5 | 0.84 |
| | 20 k | 1080 | 0.75 | 0.64 | 27.3 | 0.87 |
| | 30 k | 970 | 0.69 | 0.63 | 26.5 | 0.88 |
| Pt/CNMg-750 | initial | 1300 | 1.02 | 0.68 | 36.2 | 0.75 |
| | 10 k | 1070 | 0.76 | 0.65 | 24.1 | 0.86 |
| | 20 k | 965 | 0.66 | 0.64 | 19.1 | 0.93 |
| | 30 k | 895 | 0.57 | 0.63 | 17.5 | 0.94 |
| Pt/CNMg-850 | initial | 1300 | 0.97 | 0.68 | 32.3 | 0.78 |
| | 10 k | 1055 | 0.68 | 0.65 | 20.2 | 0.89 |
| | 20 k | 955 | 0.59 | 0.63 | 14.4 | 0.94 |
| | 30 k | 895 | 0.52 | 0.62 | 12.8 | 1.02 |
| Pt/CNMg-950 | initial | 1305 | 1.03 | 0.68 | 33.8 | 0.78 |
| | 10 k | 1065 | 0.75 | 0.65 | 21.2 | 0.88 |
| | 20 k | 950 | 0.65 | 0.63 | 20.1 | 0.93 |
| | 30 k | 894 | 0.56 | 0.63 | 17.1 | 1.01 |

[Evaluation Example 1-5] Evaluation of Durability of Carbon Support of PEMFC

With the evaluation of durability of the Pt catalyst, another accelerated durability test (ADT) suggested by DOE is to test the stability of a catalyst support, and was performed for new MEA with DOE protocol.

Figure 8:
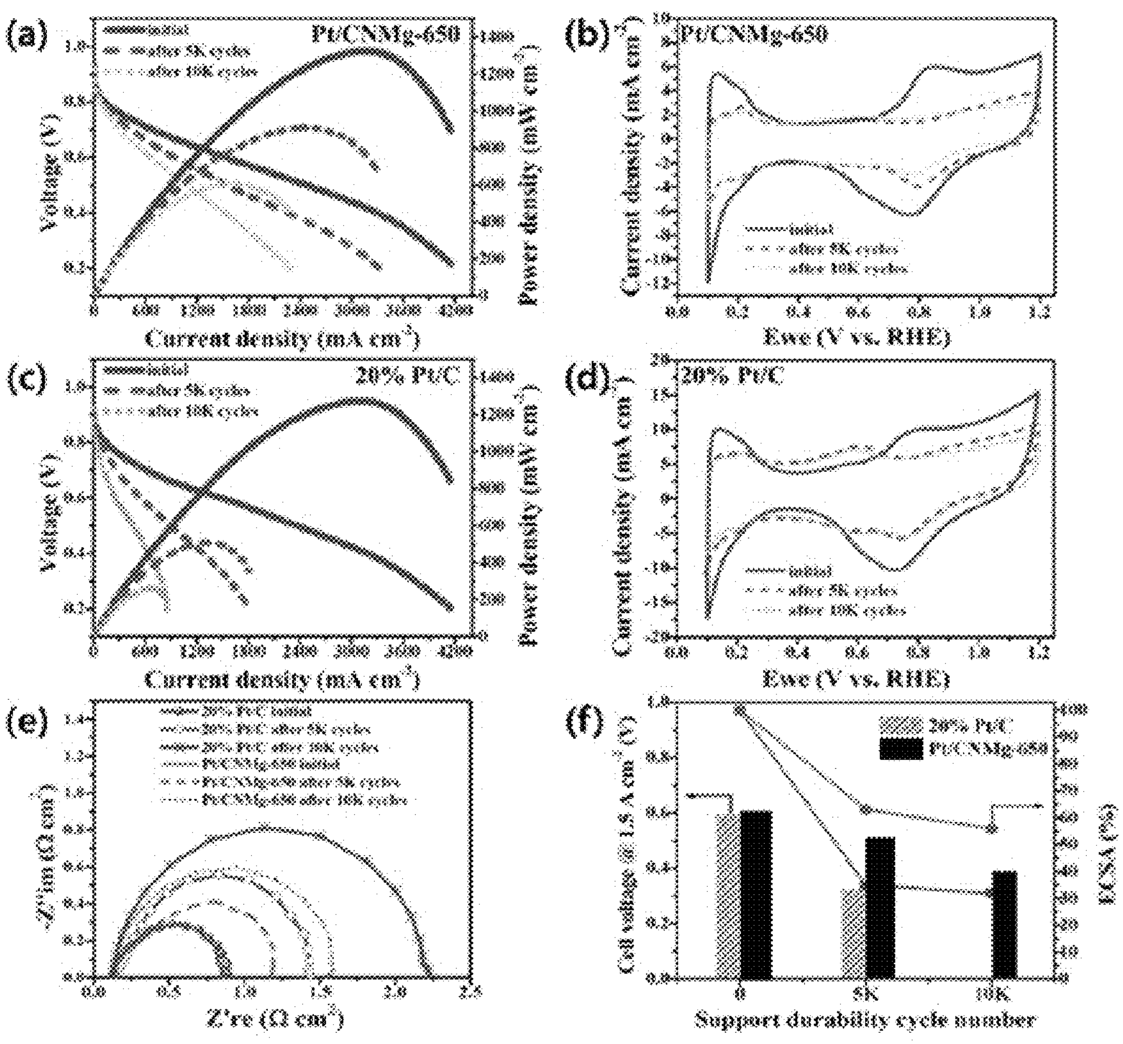
FIG. 8 shows the results of stability evaluation cycles of carbon supports, in which single cell polarization and output density curves are shown for (a) Example 1-1 (Pt/CNMg-650) and (c) commercial 20% Pt/C, respectively, CV curves each before and after 5 k cycles are shown for (b) Example 1-1 (Pt/CNMg-650) and (d) commercial 20% Pt/C, respectively, (e) electrochemical impedance spectroscopy curves are illustrated for comparison for Example 1-1 and commercial 20% Pt/C before and after 5 k cycles (@ 100 mA/$cm^2$), and (f) cell voltage determined at 1.5 $Acm^{-2}$ calculated from CV and polarization curves and normalized electrochemical surface area (ECSA) are illustrated.

According to Evaluation Example 1, in the test, 20 wt % of Pt/CNMg-650 and a Pt/C carbon support were oxidized between 1.0 V and 1.5 V at a scan rate of 500 mV/s by high-pressure application. Oxidation (corrosion) of carbon agglomerated Pt loaded in the cathode and decreased the activity of MEA. It was confirmed that both commercial Pt/C and CNMg-650 had decreased current densities and hydrogen absorption-desorption areas from the CV results ((a) to (d) of FIG. 8), but after 5 K cycles, $P_{max}$ of CNMg-650 was decreased only by about 34% from the initial results (decreased by 60% in the case of commercial 20% Pt/C). Therefore, it was found that the high crystallinity of CNMg-650 had high resistance to carbon corrosion. Therefore, it was found that it is easier for Pt supported by the nitrogen-doped highly graphitic porous carbon body of the present invention to maintain the particle size and the particle distribution than commercial Pt/C (see Table 6).

The characteristics as such may be also confirmed from the changed results of ECSA. In the ADT durability test of the support, it was observed that the size of Pt particles was increased with the loss of the support point of the support, which led to the decreased active surface area of Pt. Accordingly, increased EIS and increased Rct by cycling were shown. Referring to (e) to (f) of FIG. 8, CNMg-650 maintained a high value of 55% in ECSA after 5 k cycles, and had a little increased Rct value (38%) from 0.85 to 1.17 $\Omega cm^2$ after 5 k cycles in EIS under the conditions of 100 mA/$cm^2$ and a decreased cell voltage (@1.5A/$cm^2$) only by 0.1 V. However, commercial Pt/C had an increased Rct value by 64% from 0.87 to 1.43 $\Omega cm^2$ and a greatly decreased cell voltage (@ 1.5A/$cm^2$) by 0.27 V. These results show that since the carbon support of Pt/CNMg-650 had high crystalline properties, it had better oxidation (corrosion) durability in terms of substantial long-term life operation term under high-voltage conditions than commercial Pt/C (see Table 6 below).

TABLE 6

| Catalyst | Cycle number | $P_{max}$ (mW/cm²) | Mass activity (A/mg$_{Pt}$) | V @ 1.5 A/cm² (V) | ECSA (m²/g$_{Pt}$) | Rct @ 0.1 A/cm² (Ω cm²) |
|---|---|---|---|---|---|---|
| 20% Pt/C | initial | 1275 | 1.15 | 0.60 | 66.4 | 0.77 |
| | 5 k | 510 | 0.61 | 0.33 | 23.2 | 1.31 |
| Pt/CNMg-650 | initial | 1325 | 1.07 | 0.60 | 42.0 | 0.73 |
| | 5 k | 920 | 0.67 | 0.51 | 26.5 | 1.05 |
| Pt/CNMg-750 | initial | 1300 | 1.02 | 0.60 | 36.2 | 0.75 |
| | 5 k | 875 | 0.63 | 0.50 | 21.6 | 1.12 |
| Pt/CNMg-850 | initial | 1300 | 0.96 | 0.60 | 31.3 | 0.78 |
| | 5 k | 870 | 0.59 | 0.50 | 18.2 | 1.18 |
| Pt/CNMg-950 | initial | 1310 | 0.97 | 0.60 | 32.0 | 0.76 |
| | 5 k | 870 | 0.60 | 0.49 | 18.2 | 1.17 |

Figure 9:
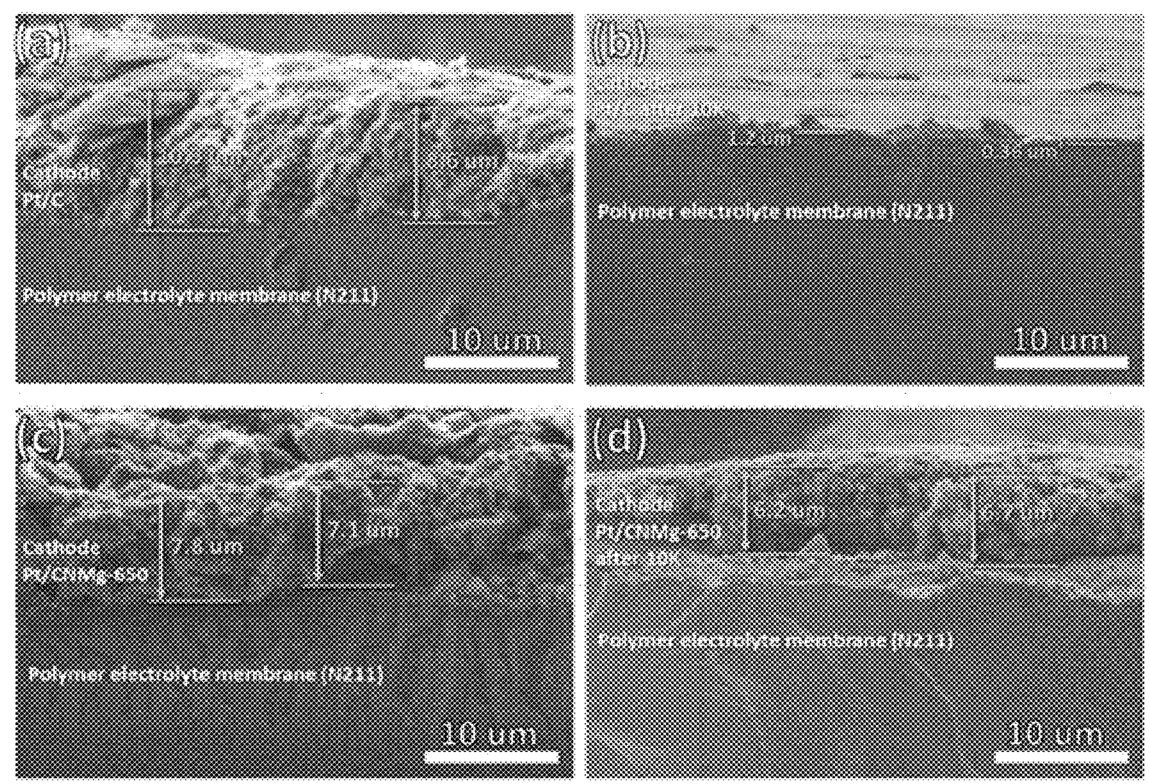
FIG. 9 investigates changes in the thickness of MEA catalyst electrode layers of (a) (c) Example 1-1 and (a) (b) commercial 20% Pt/C by SEM images before and after 10 k cycles of stability evaluation of the carbon support.
Figure 10:
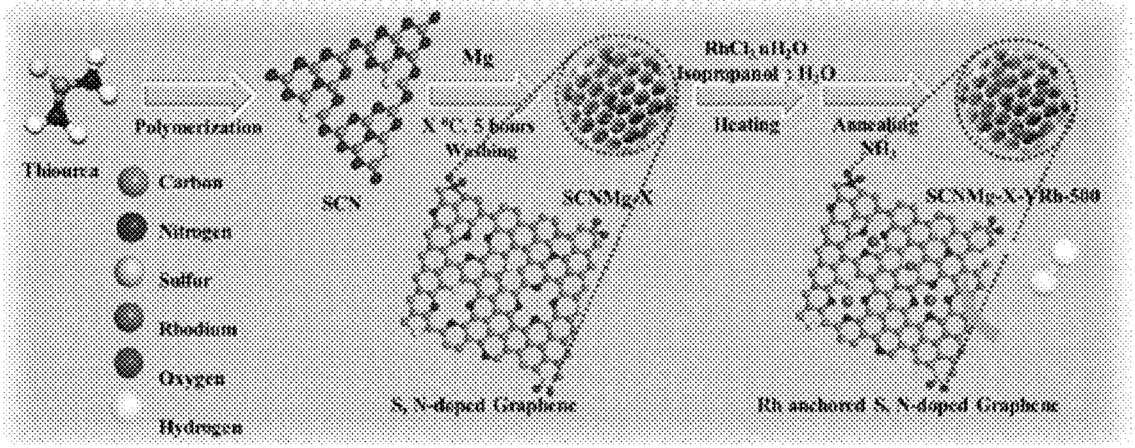
FIG. 10 is a schematic diagram showing a synthesis process of a sulfur and nitrogen double doped highly graphitic porous carbon body (SCNMg) and a catalyst including the same according to an exemplary embodiment of the present invention.

FIG. 9 shows the stability of the carbon body supports of commercial 20% Pt/C and Pt/CNMg-650 by SEM images of the thickness of the catalyst electrode layer of MEA, before and after the test. The catalyst electrode layer of Pt/CNMg-650 ((c) and (d) of FIG. 9) which was 7.8 or 7.1 um before stability evaluation was 6.7 or 6.2 um, and thus, the catalyst electrode layer was relatively well maintained. However, it was confirmed that the catalyst electrode layer of commercial Pt/C which was initially 10.3 or 8.6 um was greatly decreased to 1.2 or 0.35 um due to the rapid oxidation of the carbon support. These results are consistent with the activity decrease tendency of FIG. 8, and shows that the excellent oxidation (corrosion) durability of CNMg-650 was more effective for the maintenance of the PEMFC catalyst electrode layer.

To sum up, in the present invention, the improved performance of ORR and PEMFC was achieved by the magnesiothermic reduction of g-$C_3N_4$. It was shown that the suggested synthesis method was effective in terms of costs and energy saving, and high crystallization (graphiticity) and electrical conductivity were obtained in a low-temperature heat treatment process of lower than 1,000° C. (preferably 650° C.) from inexpensive chemical materials such as metal powder like magnesium and urea, thereby greatly improving the catalytic activity to ORR and the durability. In addition, by using the N-rich precursor, nitrogen doping in the synthesized carbon body was easily functionalized in a graphitic carbon skeleton, and interestingly, was carbonized at a relatively low temperature, and thus, a large amount of pyrrolic-N sites was formed. The pyrrolic N was thermodynamically unstable, but stabilized Pt by a strong bond to Pt, so that the size or the distribution of particles was not greatly changed, and showed high activity and durability properties as compared with commercial Pt/C. Subsequently, in the carbon body structure, pores and a 3D porous structure were formed by the pickling of magnesium and $Mg_3N_2$ particles, and thus, the specific surface area of the carbon body was increased. The pore structure may decrease the mass diffusion resistance of the graphitized carbon body.

An exemplary embodiment of the present invention provides a PEMFC single cell including a nitrogen-doped highly graphitic porous carbon body and a Pt catalyst, having high activity and durability, resulting from the excellent chemical/physical properties. The maximum power ($P_{max}$) of the present invention was decreased by 28%, but the maximum power of commercial Pt/C was decreased by 64%, after 30 k cycles. In addition, the results of analyzing the mass activity (@ 0.8V) and ECSA after 30 k cycles teach that the Pt utilization of the present invention was superior to commercial Pt/C. These results mean that the nitrogen-doped carbon body having a high pyrrolic-N ratio improved stability to Pt and resistance to carbon corrosion. In the Pt catalyst ADT test, the results of the mass activity and ECSA maintenance after 20 k cycles were that the catalyst of the present invention was more stable than the commercial catalyst, and it was analyzed that this was due to nitrogen doping with high crystallinity (graphiticity) and high pyrrolic N ratio.

Example 2

Examples 2-1 to 2-4

1) Production of Polymer (Hereinafter, Referred to as SCN) Using Nitrogen Element and Sulfur Element-Containing Precursor 10 g of thiourea (Sigma Aldrich, 99%) was added to an alumina boat, the alumina boat was covered, and a heat treatment was performed in a tube furnace at 500° C. at a heating rate of 5° C./min under a nitrogen atmosphere for 2 hours to obtain a polymer (hereinafter, referred to as SCN) yellow powder doped with nitrogen (N) and sulfur (S).

2) Production of Sulfur and Nitrogen Double Doped Highly Graphitic Porous Carbon Body (Hereinafter, Referred to as SCNMg-X)

3 g of SCN obtained was mixed with the same weight of Mg powder (Sigma Aldrich, 99%) using a ball mill for 20 minutes, and the well-mixed powder was added to an alumina crucible and heat-treated in a tube furnace at a temperature according to each example, X° C. (650° C., 750° C., 850° C., 950° C., Examples 2-1 to 2-4), at a heating rate of 5° C./min in an argon (Ar) flow atmosphere (flow rate of 200 mL/min) for 5 hours, thereby obtaining black powder (hereinafter, referred to as SCNMg-X-BE).

Subsequently, the heat-treated product was added to a 0.5M $H_2SO_4$ solution, and stirred at 80° C. for 12 hours to perform acid leaching. The recovered product was filtered with deionized water, and dried under vacuum at 70° C. to obtain a sulfur and nitrogen double doped highly graphitic porous carbon body (hereinafter, referred to as SCNMg-X).

Evaluation Example 2

Figure 11:
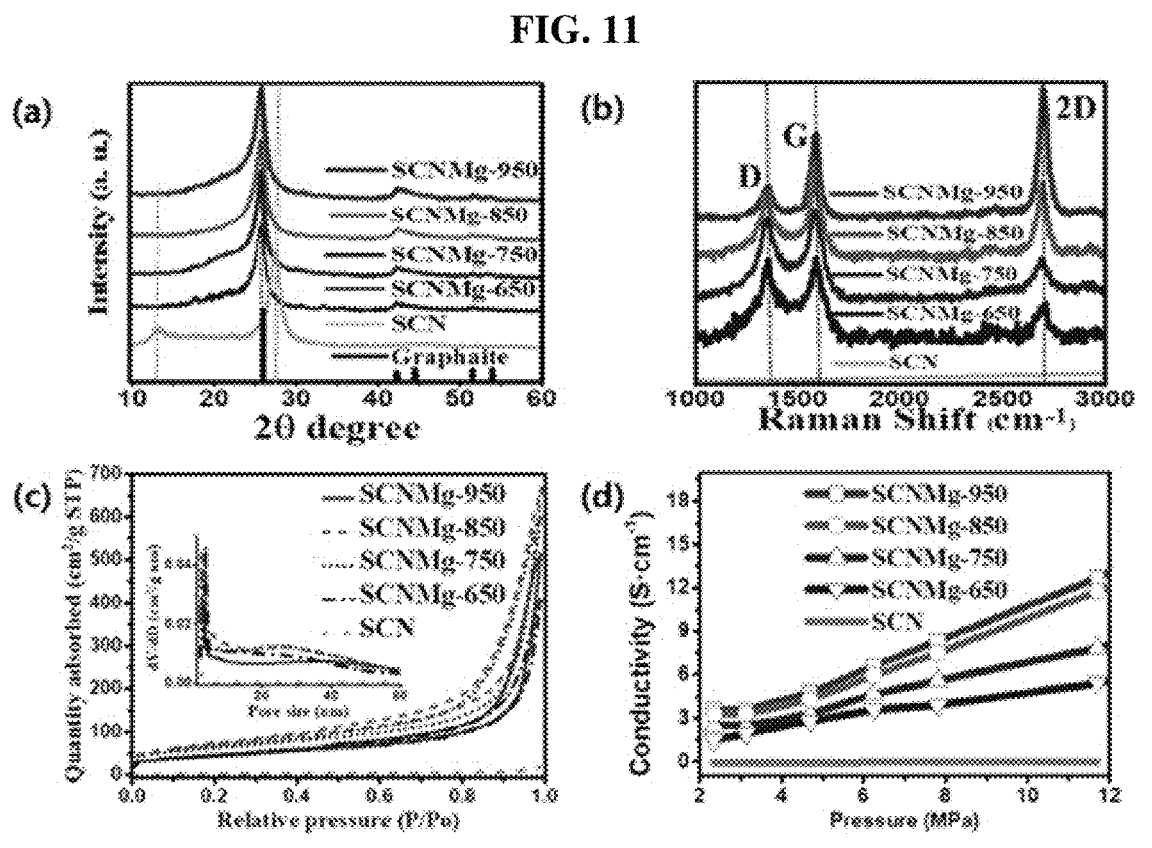

[Evaluation Example 2-1] Results of Analyzing Properties Such as High Crystallinity of Carbon Body FIG. 11 is graphs of (a) X-ray diffraction (XRD) spectroscopy analysis results of the carbon supports of the examples and the reference example, (b) Raman spectrum analysis, (c) $N_2$ absorption desorption isotherms, and (d) electrical conductivity depending on pressurized pressure.

In (a) of FIG. 11, the peaks of SCNMg-X (650, 750, 850, and 950° C.) were shifted from a position at 27.5° corresponding to a (002) plane by lamination of a graphite type polymer to a position at 25.85° showing a graphite type carbon as compared with SCN, and thus, it was confirmed that the polymer was carbonized in the final product, and also had high crystallinity.

Figure 12:
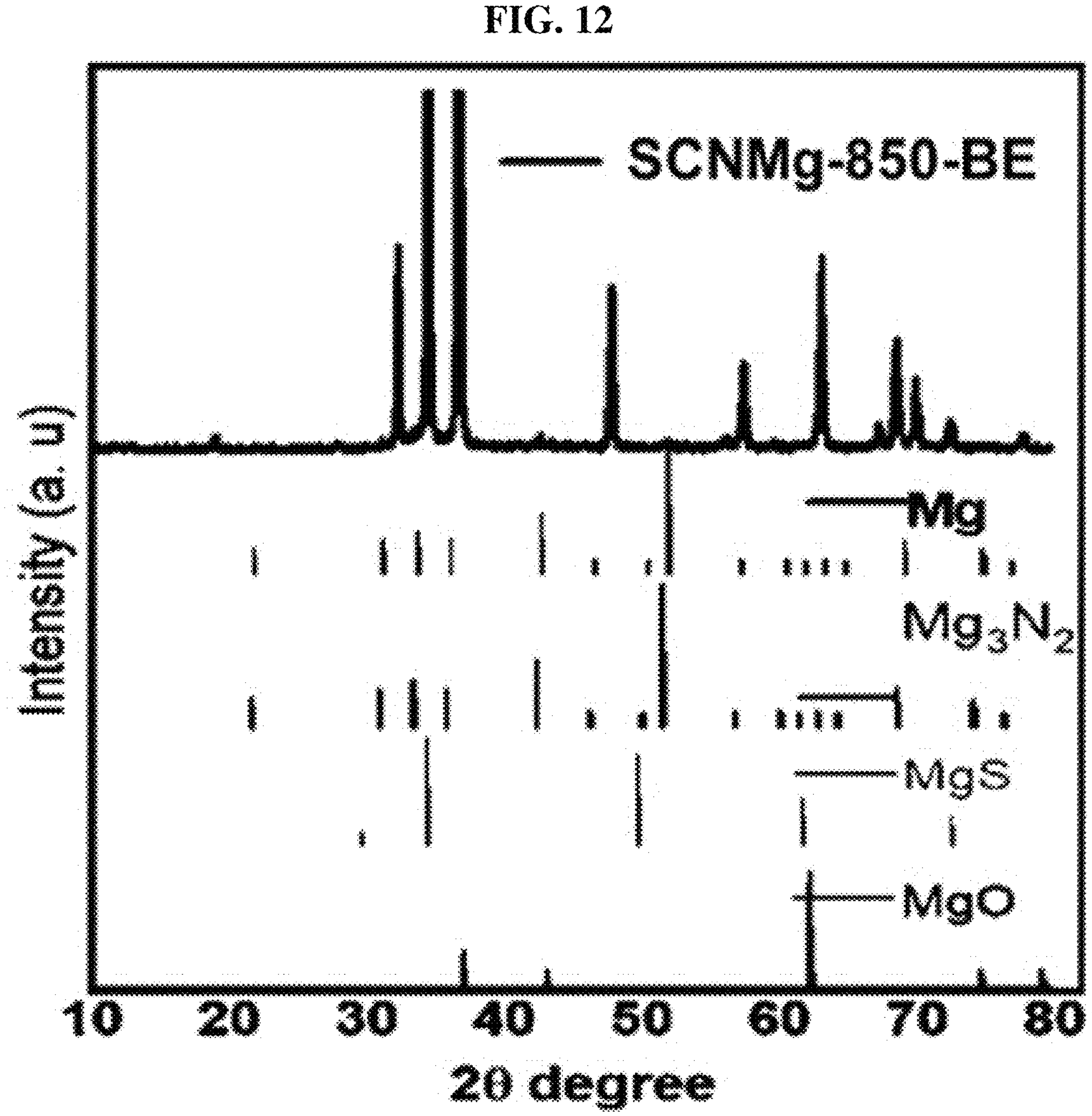
FIG. 12 is a graph of X-ray diffraction (XRD) spectroscopy analysis for SCNMg-850-BE before removing Mg by pickling.

Meanwhile, referring to FIG. 12, it was confirmed that SCNMg-850-BE obtained before acid leaching after magnesiothermic reduction had $Mg_3N_2$, MgS, and MgO formed, which suggests that nitrogen and sulfur contained in SCN reacted with Mg powder in the magnesiothermic reduction process to form $Mg_3N_2$ and MgS.

In (b) of FIG. 11, it was found that SCNMg-X had new peaks occurring at a D band (1350 $cm^{-1}$), a G band (1600 $cm^{-1}$), and a 2D band (2700 $cm^{-1}$) as compared with SCN.

The Raman spectrum analysis results of Examples 2-1 to 2-4 are summarized in the following Table 7. Referring to Table 7, it was found that SCNMg-X had high crystallinity (graphiticity) and was formed of about less than 5, preferably about 2 or 3, and more preferably about 1 or 2 graphene layers.

TABLE 7

| Sample | $I_D/I_G$ | $I_{2D}/I_G$ | The number of graphene layers |
|---|---|---|---|
| SCNMg-650 | 0.95 | 0.45 | <5 |
| SCNMg-750 | 0.92 | 0.5 | <5 |
| SCNMg-850 | 0.69 | 0.9 | 2~3 |
| SCNMg-950 | 0.66 | 1.5 | 1~2 |
| SCN | — | — | — |

Figure 13:
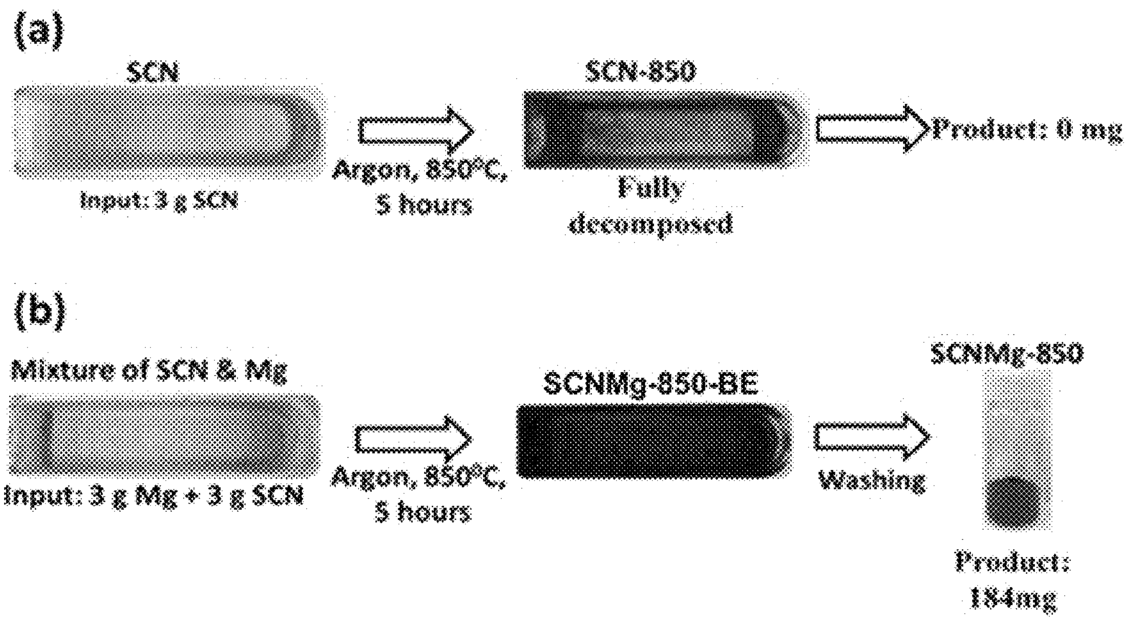
FIG. 13 is a photograph in which a product remaining after a heat treatment (SCNMg-850-BE, SCN-850) and SCNMg-850 remaining after washing are compared, depending on whether Mg was added to an alumina crucible.

Meanwhile, it was confirmed that in SCN-850 which was synthesized under the same conditions without Mg, SCN was almost all decomposed in the high-temperature treatment, so that it was difficult to recover the sample (see FIG. 13), the Raman spectrum analysis was not able to be performed, and it was difficult to use it as a carbon support for a fuel cell or a hydrogen generation reaction.

In (c) of FIG. 11, a nitrogen adsorption desorption isotherm was measured, and the specific surface area (BET) of SCN and SCNMg-X, the micropore volume, the mesopore volume, the total pore volume, and the average pore size calculated therefrom are summarized in the following Table 8. Referring to (c) of FIG. 11, it was confirmed that micropores were present in an isothermal low pressure ($P/P_0<0.01$), and SCNMg-X showed a rapid increase in a nitrogen adsorption amount in a range of 0.5~0.8 $P/P_0$, which proves the presence of mesopores, and an increase in the nitrogen adsorption amount in a range of 0.9~$P/P_0$ explains the presence of macropores.

TABLE 8

| Sample | BET surface area ($m^2/g$) | Total pore volume ($cm^3/g$) | Micropore volume ($cm^3/g$) | Mesopore volume ($cm^3/g$) | Average pore size diameter (nm) |
|---|---|---|---|---|---|
| SCN | 9.46 | 0.033 | 0.004 | 0.029 | 13.753 |
| SCNMg-650 | 157 | 0.652 | 0.006 | 0.646 | 15.02 |
| SCNMg-750 | 224 | 0.961 | 0.007 | 0.954 | 16.729 |
| SCNMg-850 | 254 | 1.069 | 0.004 | 1.065 | 16.291 |
| SCNMg-950 | 160 | 0.825 | 0.016 | 0.809 | 20.258 |

From Table 8 and (c) of FIG. 11, it was found that the examples of the present invention had a very improved specific surface area as compared with SCN. Specifically, it was confirmed that SCNMg-X had a specific surface area, a total pore volume, and a mesopore volume which were significantly increased as compared with SCN, and also, an increased average pore size. It was analyzed that this phenomenon was due to the fact that magnesium vapor penetrated into the inside of SCN in the carbonization process and reacted with nitrogen and sulfur to form magnesium nitride and sulfide, thereby breaking the tri-s-triazine ring structure of SCN, and thereafter, pores were formed in the carbon structure by removing the magnesium nitride and sulfide in the acid leaching. In particular, it was confirmed that the mesopore volume was significantly increased as compared with the micropores. As described above, the mesopores were good for improving the crystallinity of the carbon body, and favorable for reaction material transfer.

In (d) of FIG. 11, it was confirmed that SCNMg-X had improved electrical conductivity properties as compared with SCN, and thus, it was expected that electron transfer resistance was much lowered to improve electrocatalyst activity. It was analyzed that this phenomenon was due to the fact that SCNMg-X was formed of highly graphitic (highly crystalline) bilayer to 10 or fewer multi-layer graphenes.

[Evaluation Example 2-2] Analysis of Morphology of Carbon Body

Figure 14:
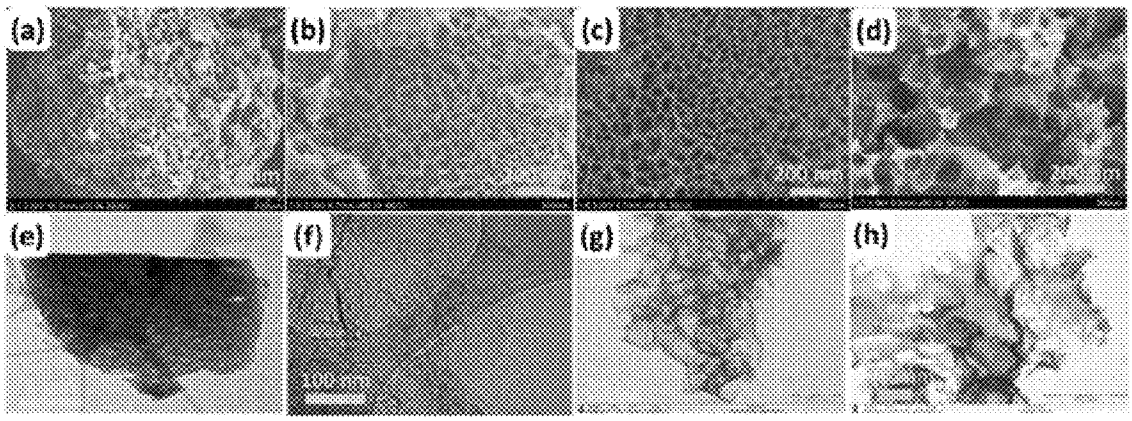
FIG. 14 is SEM and TEM images of (a) and (e) SCN, (b) and (f) SCNMg-750, (c) and (g) SCNMg-850, and (d) and (h) SCNMg-950.

From FIG. 14, it was confirmed that SCN showed a structure in the form of a large lump having low porosity (SEM and TEM images of SCN: see (a) and (e) of FIG. 14), and thereafter, SCNMg-X produced after magnesiothermic reduction had a honeycomb-like structure having uniform porosity. That is, the SEM image of SCNMg-X may be seen in (b) to (d) of FIG. 14 and the TEM images thereof may be seen in (f) to (h) of FIG. 14.

[Evaluation Example 2-3] Analysis of Chemical Composition and the Like of Carbon Body The results of analyzing the chemical composition of the carbon body using a Vairo MACRO cube elemental analyzer are summarized in the following Table 9.

TABLE 9

| Sample | N (atom. %) | C (atom. %) | H (atom. %) | S (atom. %) |
|---|---|---|---|---|
| SCN | 59.27 | 32.16 | 2.42 | 1.66 |
| SCNMg-850-$H_2SO_4$ | 1.60 | 88.60 | 0.52 | 0.55 |
| SCNMg-850-HCl | 1.66 | 87.24 | 0.53 | 0.41 |

Figure 15:
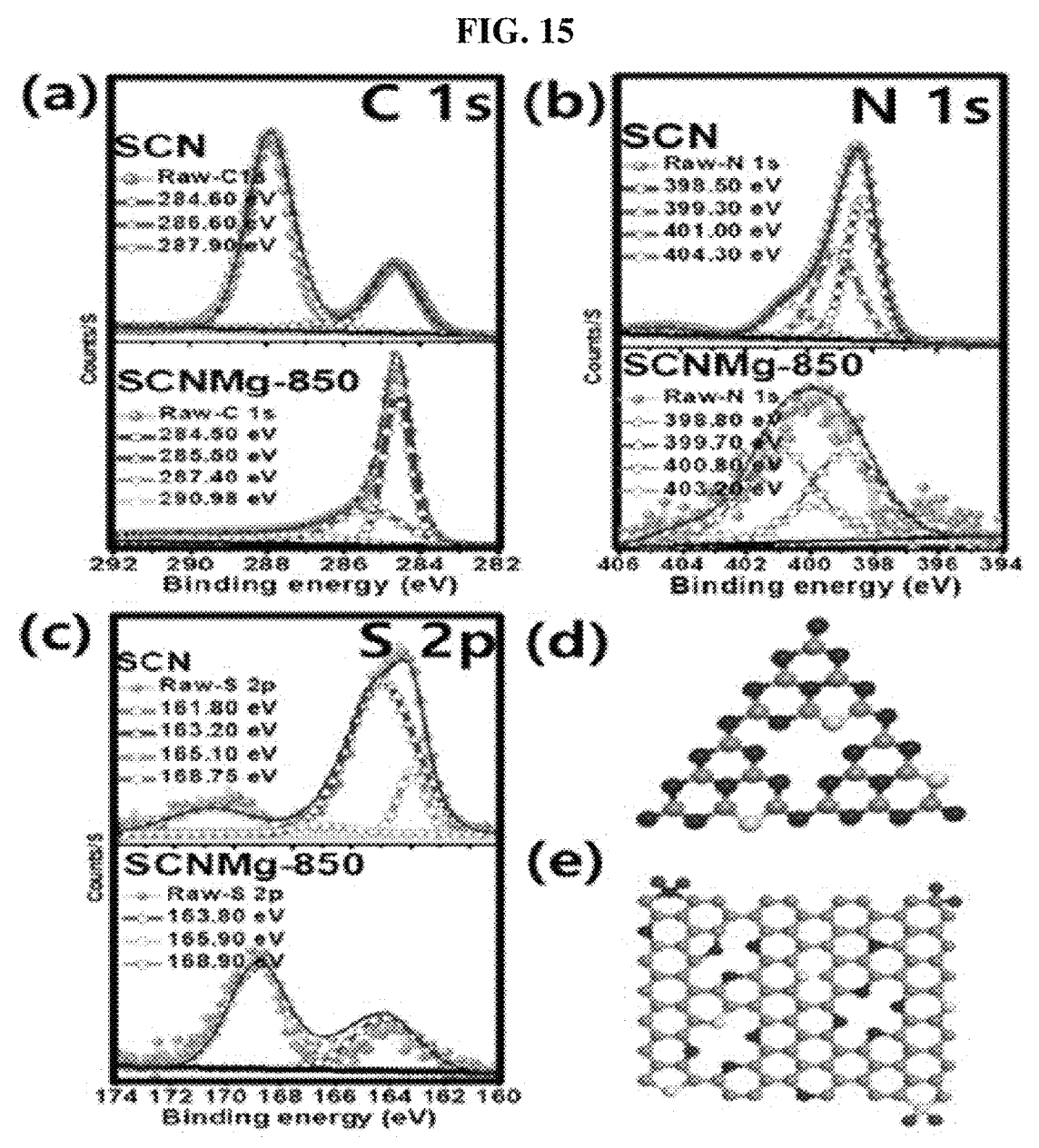

From Table 9, it was found that the contents of N and S elements were greatly decreased in the SCN structure, by acid leaching (pickling) after magnesiothermic reduction. Meanwhile, in order to confirm the effect on the elemental composition of the carbon body of the acid solution in the acid leaching step, 2M HCl was used instead of 0.5M $H_2SO_4$ to perform acid leaching, thereby producing SCNMg-850-HCl, and as a result, the content of a S element was somewhat decreased. The results imply that a small amount of $H_2SO_4$ may be adsorbed in the form of —$SO_x$ on the surface of SCNMg-850. In FIG. 15, XPS analysis was performed for analysis of the chemical states and the compositions of SCN and SCNMg-850. In FIG. 15, (a) is a C 1s spectrum, (b) is a N 1s spectrum, (c) is a S 2p spectrum, (d) is a schematic diagram of SCN, and (e) is a schematic diagram of S and N doped graphene distributed in SCNMg-X. The results of FIG. 15 were analyzed, and the chemical compositions of SCN and SCNMg-850 are summarized in the following Table 10.

TABLE 10

| Sample | C 1s (at %) | N 1s (at %) | S 2p (at %) | O 1s (at %) |
|---|---|---|---|---|
| SCN | 48.63 | 47.71 | 0.58 | 3.08 |
| SCNMg-850 | 96.58 | 0.6 | 0.23 | 2.56 |

Referring to FIG. 15 and Table 10, the magnesiothermic reduction decreased the content of N and S. It was found that in SCNMg-850, a graphene-like $sp^2$ carbon element was arranged in a porous honey comb structure, N/S/O element were present as C—N/C—S/C—O species and π-π* excitations with $sp^2$ C (see (a) of FIG. 15), N peaks of pyridinic N, pyrrolic N, graphitic N, and pyridinic N-oxide were shown (see (b) of FIG. 15), S peaks of C—S—C 2p 3/2 and C—S—C 2p ½ were shown, a sulfonic S peak like a C—$SO_x$—C moiety was shown (see (c) of FIG. 15), and an —OH group resulting from a water molecule and a $SO_x^{2-}$ peak were shown on the surface of the sample.

Examples 2-5 to 2-7

(Production of Electrode Catalyst for Fuel Cell or Water Electrolysis Reaction, SCNMg-X-YRh-Z)

SCNMg-850-YRh-Z in which a Rh metal was reduced to be supported on SCNMg-850 (Example 2-3) having excellent surface area and crystallinity among the high crystalline carbon supports produced in Examples 2-1 to 2-4 was synthesized.

100 mg of SCNMg-850 produced in Example 2-3 was ultrasonically dispersed in 20 mL of a mixture (mixture at a volume ratio of isopanol:water=1:1), and a $RhCl_3 \cdot nH_2O$ aqueous solution (18 μM, 36 μM, and 73 μM $RhCl_3 \cdot nH_2O$, Examples 2-5 to 2-7) ($RhCl_3 \cdot nH_2O$ (n=3.5) (Kojima chemicals co., ltd, 99.9%)) was added to the dispersion. Subsequently, a heat treatment at 120° C. was performed in an oil bath to evaporate all of the solvent. Then, the obtained SCNMg-850-YRh (YRh refers to the concentration of $RhCl_3 \cdot nH_2O$, Y μM) was cleaned with ethanol and water to remove unreacted metal ions, centrifuged at 14,000 rpm, and then dried under vacuum at 70° C. The obtained SCNMg-850-YRh powder was heat-treated under a gas atmosphere (flow rate of 100 mL/min) at Z° C. (500, 700, and 900° C., respectively) for 1 hour to produce an electrode catalyst (hereinafter, referred to as SCNMg-850-YRh-Z).

Comparative Examples 2-1 to 2-3

Reduced graphene oxide (hereinafter, referred to as rGO), commercial Vulcan carbon XC-72 (Sigma Aldrich, hereinafter, referred to as VC), and SCN were prepared.

rGO was produced by a thermic reduction treatment of the graphene oxide synthesized by a Hummer method (hereinafter, referred to as GO) at 850° C. for 2 hours in a $NH_3$ atmosphere.

Rh-supported catalysts, rGO-36Rh-500, VC-36Rh-500, and SCN-36Rh-500 (Comparative Examples 2-1 to 2-3) were produced in the same manner as in the production of SCNMg-850-36Rh-500 of Example 2-6, except that rGO, VC, and SCN prepared were used as a support instead of SCNMg-850 of the examples.

Figure 16:
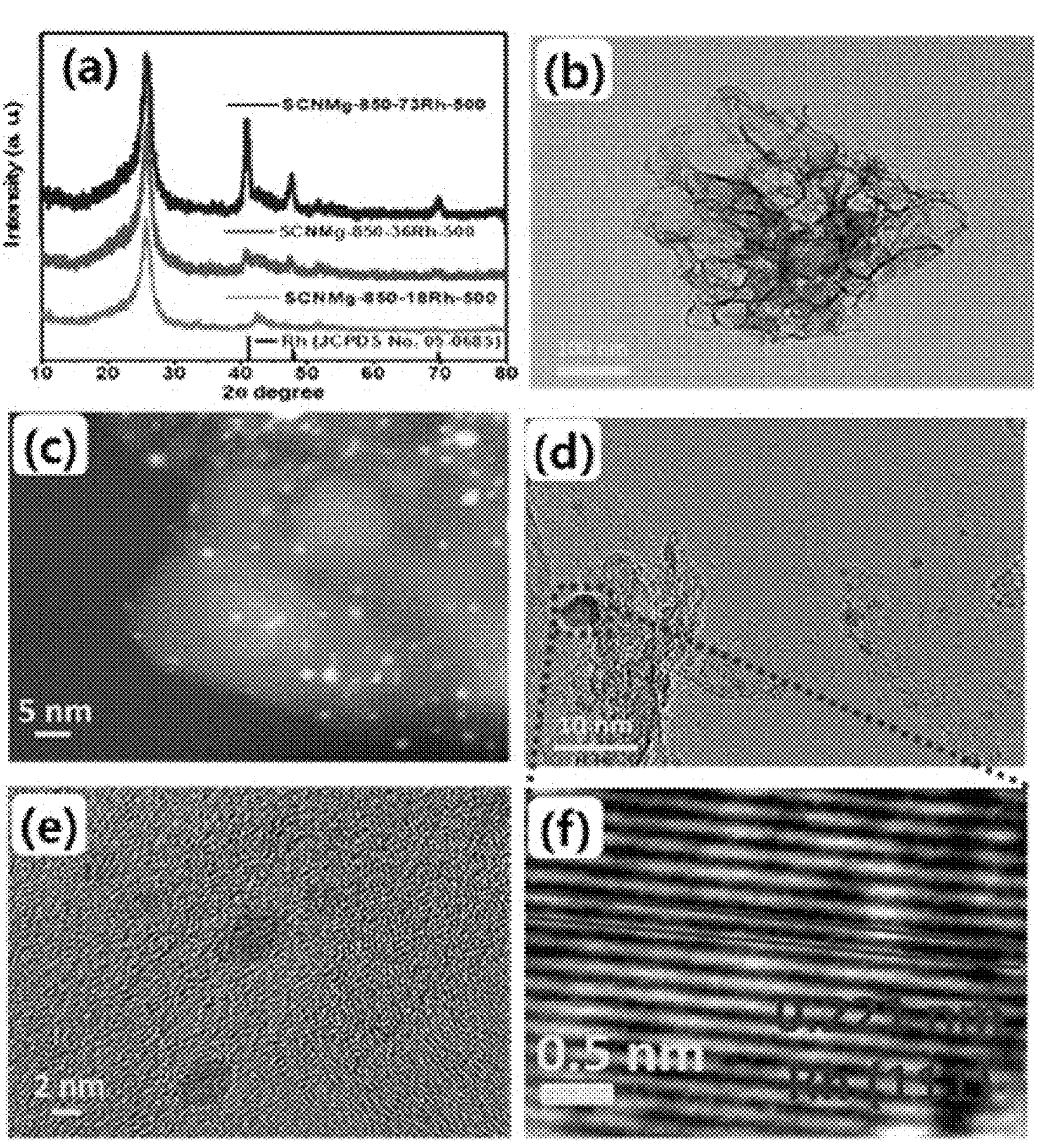
FIG. 16 shows (a) XRD spectroscopy analysis results of SCNMg-850-YRh-500 (Y is 73, 36, and 18), (b) a TEM image for SCNMg-850-36Rh-500, (c) a high-angle annular dark-field scanning TEM (HAADF-STEM) image for SCNMg-850-36Rh-500, (d) a HR-TEM image for SCNMg-850-36Rh-500, (e) an Ultra HR-TEM image for SCNMg-850-36Rh-500, and (f) an image showing crystal lattice lines by enlarging the box in (d) of FIG. 16.

[Evaluation Example 2-4] Synthesis of Rh-Supported N and S Double Doped Porous Carbon Body Catalyst (a) of FIG. 16 shows the XRD analysis results of SCNMg-850-YRh-500, and it was confirmed whether Rh was successfully supported on the SCNMg-850 support. In FIG. 16, the peaks occurring at 2θ=24° and 43° mean graphene, and the peaks occurring at 41.07°, 47.78°, and 69.87° mean (111), (200), and (220) crystal planes of cubic Rh (JCPDS data No. 05-0685). From (a) of FIG. 16, it was found that in SCNMg-850-18Rh-500 and SCNMg-850-36Rh-500, the Rh peak described above appeared very small, and in SCNMg-850-73Rh-500, the Rh crystal plane peak appeared large, and thus, the phase was changed, and also the particle size was formed to be increased depending on the increase in the loading amount of $Rh^{3+}$.

Figure 17:
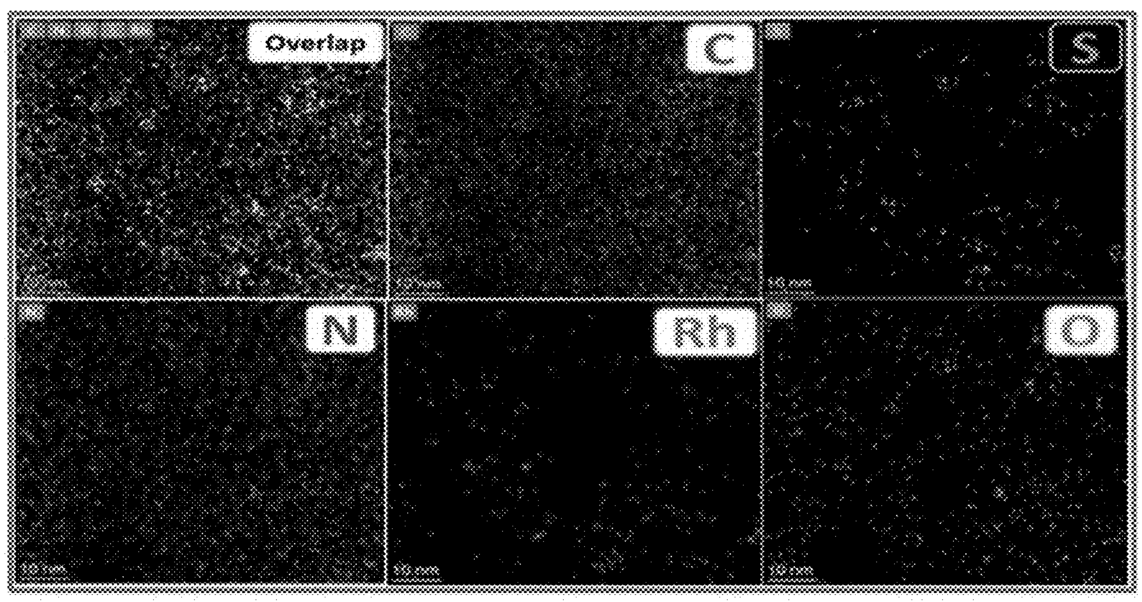
FIG. 17 is an energy dispersion spectroscopy (EDS) mapping of each element for SCNMg-850-36Rh-500, that is, an EDS mapping image of the entire (overlap), and carbon (C), sulfur (S), nitrogen (N), rhodium (Rh), and oxygen (O) elements.

From FIG. 16, TEM was measured for confirming the formation of Rh nanoparticles dispersed in and supported on the SCNMg-850 support, and it was found that SCNMg-850-36Rh-500 had a sheet-shaped structure having a uniform pore distribution, and was formed with a length of several tens to hundreds of nm ((b) of FIG. 16). In addition, from the results of high-angle annular dark-field scanning TEM (HAADF-STEM), it was confirmed that SCNMg-850-36Rh-500 included a Rh cluster which was uniformly dispersed and formed on the SCNMg-850 support ((c) of FIG. 16). From the results of energy dispersive spectroscopy (EDS), it was confirmed that C, N, S, Rh, and O elements were uniformly dispersed (FIG. 17). In addition, from the results of HR-TEM measurement, it was confirmed that SCNMg-850-36Rh-500 included a Rh cluster which was uniformly dispersed and formed in a SCNMg-850 support, and the particle size of the Rh cluster was usually formed at 1 to 3 nm ((d) of FIG. 16). In the HR-TEM image magnified at a high magnification, a boundary between very small Rh nanoparticles and graphene was not clearly observed, and this suggests that the element on the surface of the Rh cluster was partially bonded to the S and N elements of the graphene structure ((e) of FIG. 16). In the HR-TEM magnified image of the red box region, the lattice distance of the Rh cluster was 0.221 nm, which coincided with the (111) plane of cubic Rh ((f) of FIG. 16). However, it was confirmed that when the content of $RhCl_3 \cdot nH_2O$ was decreased (18 μM $RhCl_3 \cdot nH_2O$), Rh particles tended to be non-uniformly dispersed, and on the contrary, when the content of $RhCl_3 \cdot nH_2O$ was increased (73 μM $RhCl_3 \cdot nH_2O$), the Rh particles had an increased size and were partially agglomerated.

Figure 18:
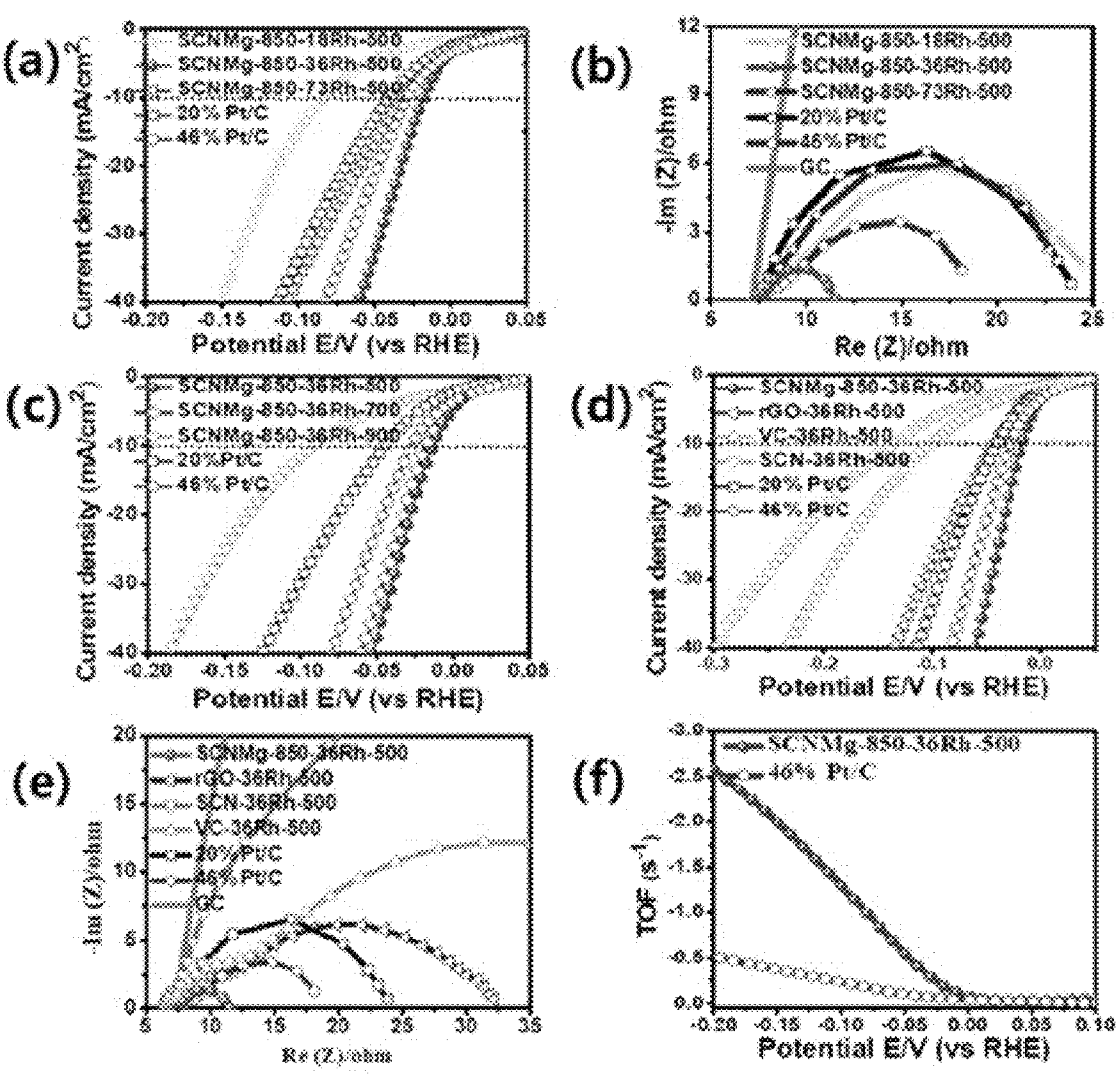
FIG. 18 is (a) LSV polarization curves and (b) EIS Nyauist plots for SCNMg-850-18Rh-500, SCNMg-850-36Rh-500, SCNMg-850-73Rh-500, and commercial Pt/C (Pt content: 20% and 46%), (c) LSV polarization curves for SCNMg-850-36Rh-500, SCNMg-850-36Rh-700, SCNMg-850-36Rh-900, and commercial Pt/C (Pt content: 20% and 46%), (d) LSV polarization curves and (e) EIS Nyquist plots for SCNMg-850-36Rh-500, rGO-36Rh-500, VC-36Rh-500, SCN-36Rh-500, and commercial Pt/C (Pt content: 20% and 46%), and (f) TOF curves for SCNMg-850-36Rh-500 and commercial Pt/C (Pt content: 46%).
Figure 19:
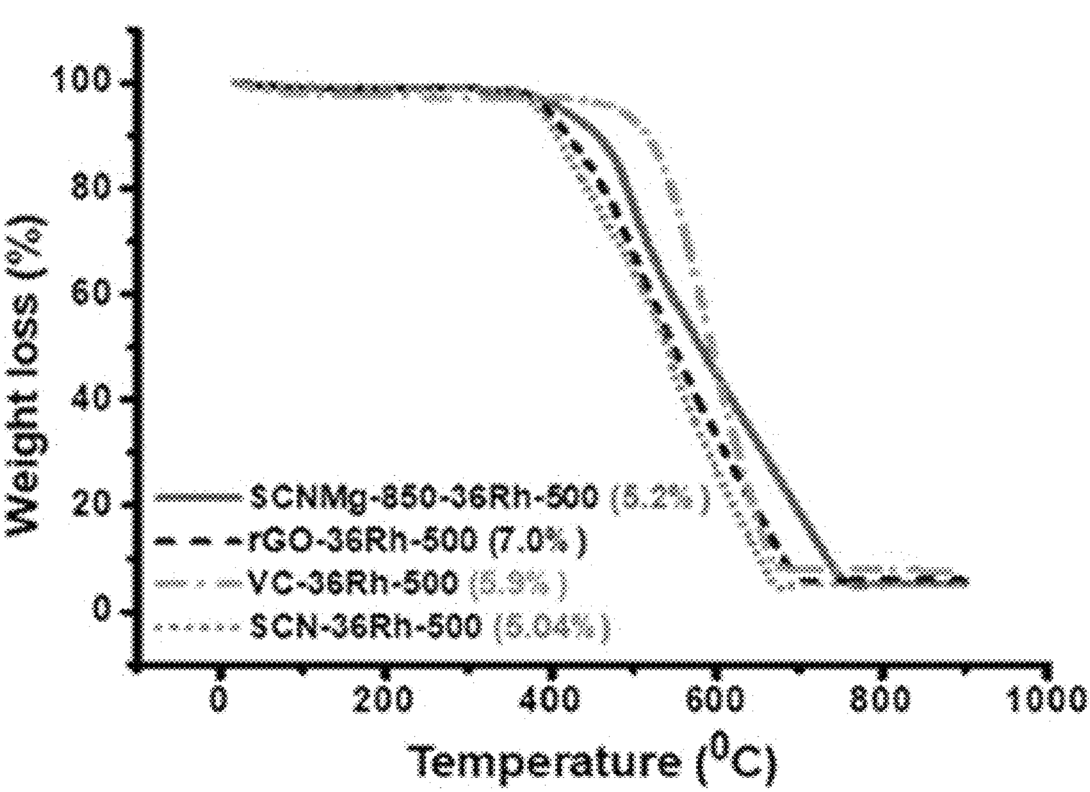
FIG. 19 is a graph of thermogravimetric analysis (TGA) of SCNMg-850-36Rh-500, VC-36Rh-500, and rGO-36Rh-500.

[Evaluation Example 2-5] Electrochemical Properties of Rh-Supported N and S Double Doped Porous Carbon Body Catalyst (a) of FIG. 18 is a linear sweep voltammetry (LSV) graph for the examples (SCNMg-850-YRh-500, Y is 18, 36, and 73) and the comparative examples (commercial Pt/C, Pt content: 20 wt % and 46 wt %). At this time, it was measured at a scan rate of 5 mV/sec in 1.0 M KOH. As a result, the SCNMg-850-36Rh-500 catalyst showed the best HER performance. Meanwhile, referring to TGA results, it was found that the content of Rh in SCNMg-850-36Rh-500 was 5.2 wt % (see FIG. 19). Meanwhile, the SCNMg-850-36Rh-500 catalyst required an overvoltage of 18 mV in order to have a current density of 10 $mA/cm^2$, but commercial Pt/C (Pt content: 20 wt % and 46 wt %) required a higher overvoltage (26 mV, 40 mV).

Referring to (b) of FIG. 18, electrode kinetics for $H^+$ reduction at an overpotential of 20 mV was analyzed by electrochemical impedance spectroscopy. SCNMg-850-36Rh-500 had significantly low charge transfer resistance as compared with commercial Pt/C, and this means a rapid faradaic process in an interface of a catalyst and an electrolyte.

Figure 20:
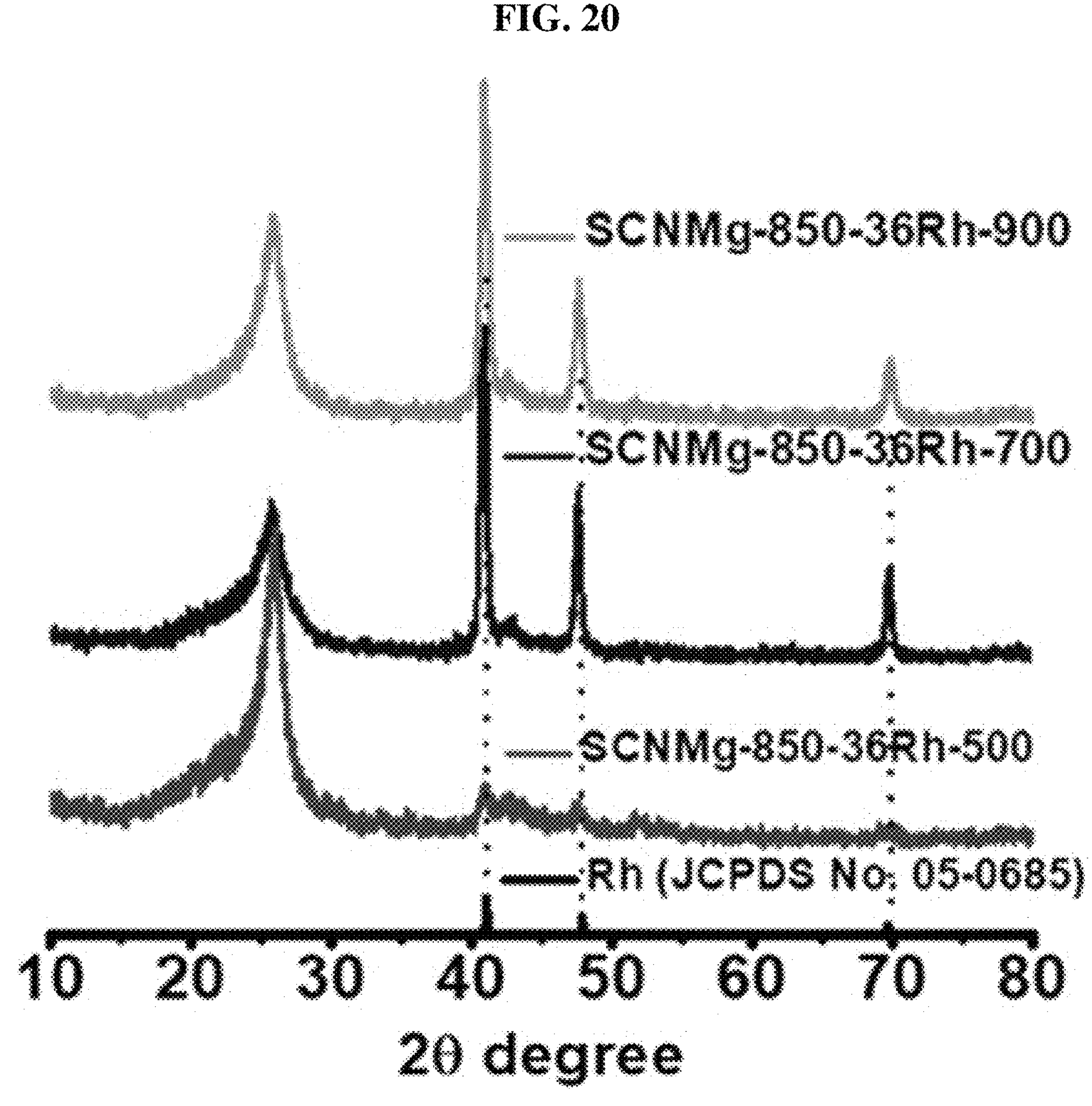
FIG. 20 is a XRD spectroscopy analysis graph of SCNMg-850-36Rh-500, SCNMg-850-36Rh-700, and SCNMg-850-36Rh-900.
Figure 21:
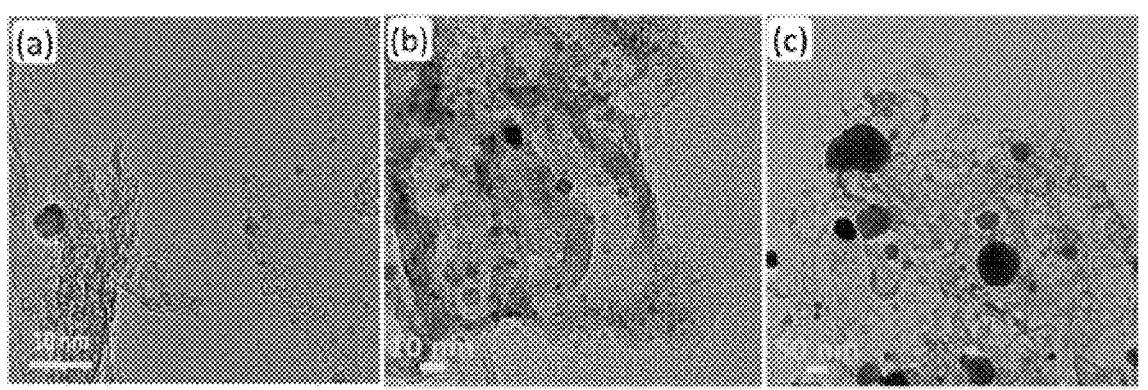
FIG. 21 is TEM images of (a) SCNMg-850-36Rh-500; (b) SCNMg-850-36Rh-700; and (c) SCNMg-850-36Rh-900.

In addition, a loading amount and an annealing temperature in the electrocatalytic reaction are one of core elements. A SCNMg-850-36Rh sample produced for analyzing a degree to which an annealing temperature affects the HER performance of the electrocatalyst was annealed at 500, 700, and 900° C., respectively, under a $NH_3$ gas flow. Referring to (c) of FIG. 18, it was found that the HER performance of SCNMg-850-36Rh-500 was the best. It was analyzed that the results were affected by the uniform distribution of the ultra-small sized Rh clusters. It is because it is known that uniform distribution of the ultra-small sized particles is expressed by high electrocatalyst activity. In this regard, as compared with SCNMg-850-36Rh-500, SCNMg-850-36Rh-700 and SCNMg-850-36Rh-900 showed strong peaks corresponding to 2θ degrees=40.010, 47.780, and 69.870, according to XRD analysis, and these corresponded to (111), (200), and (220) crystal planes and showed that the Rh particle size grew very large (see FIG. 20). Meanwhile, the same results were confirmed also from the TEM images (see FIG. 21). That is, when annealing was performed at a temperature of 700° C. and 900° C. as compared with 500° C., Rh particles were agglomerated to form relatively large-sized particles, and it was found therefrom that the activity of the catalyst was decreased.

In addition, as described above, the carrier (support) has a very important role in the interaction of metal ions/nanoparticles. In order to evaluate the role of the support, the HER performances of the example (SCNMg-850-36Rh-500) and Comparative Examples 2-1 to 2-3 (rGO-36Rh-500, VC-36Rh-500, and SCN-36Rh-500) were compared. Referring to (d) of FIG. 18, from the LSV profile, the example showed higher HER activity than the comparative examples, and it was analyzed that this is because SCNMg-850 had the sufficient number of electron-rich elements which may be bonded to an empty d-orbital of Rh, and thus, the active site was exposed to assist the uniform distribution of ultra-small sized Rh nanoparticles. However, in the comparative examples, large Rh particles were non-uniformly distributed, and also, these showed a small specific surface area, multi-layered graphene, and a low electrical conductivity, and as a result, showed low electrochemical catalytic HER activity. On the contrary, SCNMg-850 formed graphene having a high specific surface area and 2-3 layers, provided excellent electrical conductivity to be in contact with an electrolyte using the maximum surface of the catalyst, and had an excellent electrode charge transfer rate, thereby having excellent electrocatalyst HER activity.

Figure 22:
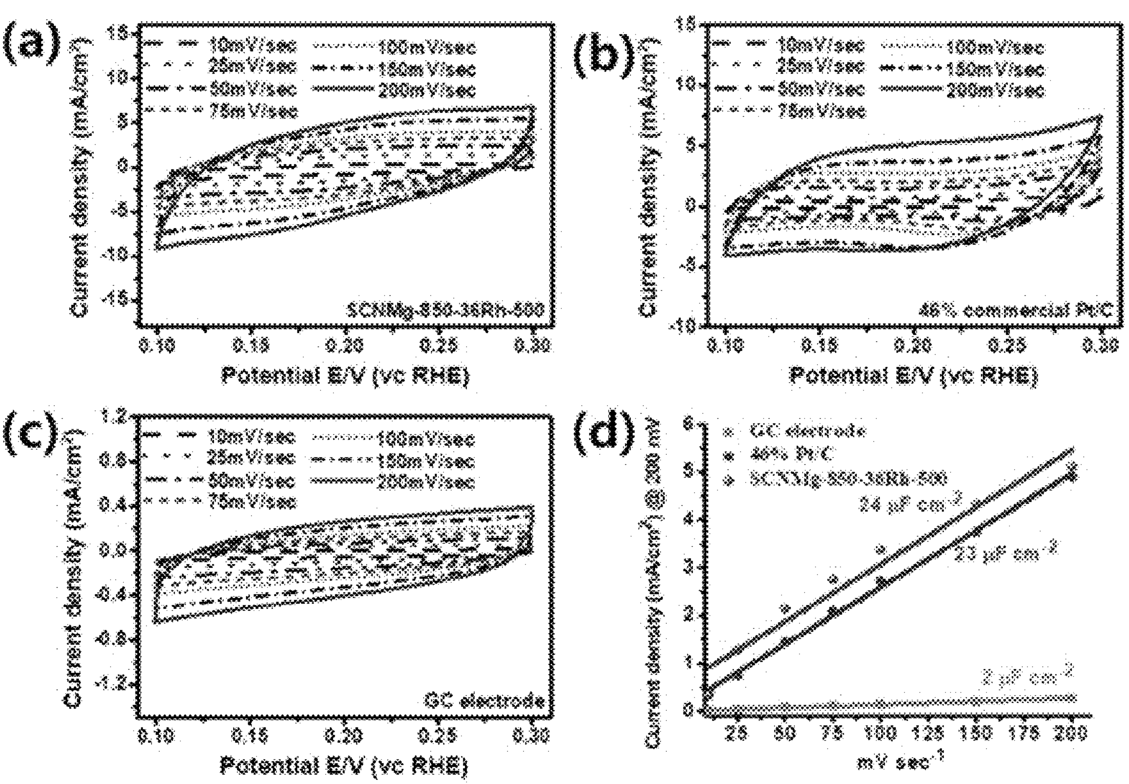
FIG. 22 is graphs showing CV curves measured at different scan rates in 0.1-0.3 V potential windows of each of (a) SCNMg-850-36Rh-500; (b) 46% Pt/C; and (c) a GC electrode, and (d) a double layer capacitance for SCNMg-850-36Rh-500, 46% Pt/C, and a GC electrode.

Therefore, referring to the Nyquist plot in (e) of FIG. 18, it was found that the charge transfer rate of SCNMg-850-36Rh-500 was higher than those of VC-36Rh-500, rGO-36Rh-500, and SCN-36Rh-500, and generated a rapid faradaic process in the interface of the catalyst and the electrolyte. In addition, since the electrochemical active surface area (ECSA) was proportional to a double-layer capacitance, referring to the results of (d) of FIG. 22, the SCNMg-850-36Rh-500 catalyst provided a high electrochemical activity surface area for $H^+$ adsorption/desorption.

The turn of frequency (TOF) of the catalyst was measured and is shown in (f) of FIG. 18. TOF results imply that SCNMg-850-36Rh-500 may accept a high positive turn of frequency ($H_2$ $s^{-1}$) as compared with 46% Pt/C. These results show that excellent catalyst activity resulted from the high utilization of a Rh species, its unique electron structure and composition, and the overall properties. Meanwhile, in order to confirm the composition and the electron structure of SCNMg-850-36Rh-500, X-ray photoelectron spectroscopy (XPS) analysis was performed, and as the results of XPS analysis, C: 96.53, S: 0.17, N: 1.08, Rh: 0.28, and O: 1.93 at % were shown.

Although the exemplary embodiments of the present invention have been described above, the present invention is not limited to the exemplary embodiments but may be made in various forms different from each other, and those skilled in the art will understand that the present invention may be implemented in other specific forms without departing from the spirit or essential feature of the present invention. Therefore, it should be understood that the exemplary embodiments described above are not restrictive, but illustrative in all aspects.

The invention claimed is:

1. A nitrogen-doped highly graphitic porous carbon body which contains 0.5 to 6 atom % of N as a heteroelement, and has a peak intensity ratio $I_D/I_G$ of less than 1.0 as measured with a Raman spectrum ($I_D$ is a peak intensity of a D band (at around 1,350 $cm^{-1}$), and $I_G$ is a peak intensity of a G band (at around 1,580 $cm^{-1}$) in the Raman spectrum), wherein the peak intensity ratio $I_{2D}/I_G$ is 0.5 or more as measured with the Raman spectrum of the nitrogen-doped highly graphitic porous carbon body, wherein $I_{2D}$ is a peak intensity of a 2D band at around 2,700 $cm^{-1}$ in the Raman spectrum.

2. The nitrogen-doped highly graphitic porous carbon body of claim 1, wherein the nitrogen-doped highly graphitic porous carbon body has a BET specific surface area of 200 to 1,000 $m^2/g$.

3. The nitrogen-doped highly graphitic porous carbon body of claim 1, wherein the nitrogen-doped highly graphitic porous carbon body includes a binding state of pyrrolic N, graphitic N, pyridinic N, or a combination thereof.

4. An electrode catalyst for a fuel cell and/or a water electrolysis reaction, comprising the highly graphitic porous carbon body of claim 1.

5. A method for producing the nitrogen-doped highly graphitic porous carbon body of claim 1, the method comprising: (a) polymerizing a nitrogen element-containing precursor to produce a polymer; (b) mixing the polymer and metal powder in an inert atmosphere, and then heat-treating the mixture at a temperature equivalent to or higher than a melting point of the metal; and (c) adding a product from the heat treatment to an acid solution and performing stirring.

6. The method for producing a nitrogen-doped highly graphitic porous carbon body of claim 5, wherein the nitrogen element-containing precursor is urea, dicyandiamide, melamine, aniline, ethylenediamine, ethylene diamine tetraacetic acid (EDTA), or a combination thereof, and the metal powder is magnesium (Mg), calcium (Ca), aluminum (Al), lithium (Li), sodium (Na), potassium (K), or mixed powder thereof.

7. The method for producing a nitrogen-doped highly graphitic porous carbon body of claim 5, wherein the polymer contains 40 to 80 atom % of N as a heteroelement.

8. The method for producing a nitrogen-doped highly graphitic porous carbon body of claim 5, wherein in (b), the polymer formed and the metal powder are mixed at a weight ratio of 1:0.5 to 1:3.

9. The method for producing a nitrogen-doped highly graphitic porous carbon body of claim 5, wherein in (b), the polymer and the metal powder are mixed at an atomic molar ratio of N:M of 1:0.3 to 1:7.5 (N is nitrogen contained in the polymer as a heteroelement, and M is a metal element of the metal powder).

* * * * *